US012713442B2

(12) United States Patent
Huang et al.

(10) Patent No.: US 12,713,442 B2
(45) Date of Patent: Aug. 18, 2026

(54) PDCCH ENHANCEMENTS FOR RADAR COEXISTENCE

(71) Applicant: InterDigital Patent Holdings, Inc., Wilmington, DE (US)

(72) Inventors: Joe Huang, Montville, NJ (US); Sudhir Pattar, Mount Laurel, NJ (US); Philip Pietraski, Jericho, NY (US); Tariq Elkourdi, Belleville, NJ (US); Phillip Leithead, King of Prussia, PA (US); Jane Mack, Melville, NY (US); Daniel Steinbach, Commack, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 566 days.

(21) Appl. No.: 18/309,457

(22) Filed: Apr. 28, 2023

(65) Prior Publication Data

US 2023/0354368 A1 Nov. 2, 2023

Related U.S. Application Data

(60) Provisional application No. 63/336,651, filed on Apr. 29, 2022.

(51) Int. Cl.
*H04W 72/232* (2023.01)
*H04W 72/0453* (2023.01)
*H04W 72/541* (2023.01)

(52) U.S. Cl.
CPC ..... *H04W 72/232* (2023.01); *H04W 72/0453* (2013.01); *H04W 72/541* (2023.01)

(58) Field of Classification Search
CPC .......... H04W 72/232; H04W 72/0453; H04W 72/541; H04L 5/0053; H04L 5/0091
See application file for complete search history.

(56) References Cited

U.S. PATENT DOCUMENTS

2019/0045549 A1* 2/2019 Wu .................... H04W 72/542
2020/0008235 A1* 1/2020 Sarkis .................. H04W 72/21
(Continued)

OTHER PUBLICATIONS

Ahmadi, *5G NR Architecture, Technology, Implementation, and Operation of 3GPP New Radio Standards*, Academic Press (2019).
(Continued)

*Primary Examiner* — Christine Ng
(74) *Attorney, Agent, or Firm* — Volpe Koenig

(57) ABSTRACT

Methods and devices are disclosed to configure a wireless transmit receive unit (WTRU) with multiple physical downlink control channel (PDCCH) control resource sets (CORESETs) including at least a first PDCCH CORESET identifying first frequency resources of a downlink (DL) bandwidth part (BWP) for detection of downlink control information (DCI) and a second PDCCH CORESET identifying second frequency resources of the DL BWP for detection of DCI. The WTRU monitors one or more search spaces linked to active PDCCH CORSETs for transmissions of DCI. On determination that an interferer may impact PDCCH resources, a network sends, and a WTRU receives, signaling to suspend monitoring of search spaces linked to one of the first PDCCH CORSET or the second PDCCH CORESET for a suspend time period. Upon expiration of the suspend time period or sending/receiving unsuspend signaling, the WTRU resumes monitoring search spaces linked to a previously suspended PDCCH CORESET.

17 Claims, 18 Drawing Sheets

(56) References Cited

U.S. PATENT DOCUMENTS

| | | | | |
|---|---|---|---|---|
| 2020/0229092 | A1* | 7/2020 | Wu | H04W 76/28 |
| 2020/0389874 | A1* | 12/2020 | Lin | H04L 5/0053 |
| 2020/0404669 | A1* | 12/2020 | Seo | H04L 25/0238 |
| 2021/0273752 | A1* | 9/2021 | Takeda | H04L 1/1896 |
| 2021/0360667 | A1* | 11/2021 | Moon | H04L 5/0035 |
| 2022/0225133 | A1* | 7/2022 | Khoshnevisan | H04W 72/23 |
| 2023/0043850 | A1* | 2/2023 | Li | H04W 72/23 |
| 2023/0100135 | A1* | 3/2023 | Liu | H04W 24/08 370/252 |
| 2023/0101780 | A1* | 3/2023 | Ji | H04W 72/1263 370/329 |
| 2024/0243880 | A1* | 7/2024 | Eriksson | H04L 5/0053 |

OTHER PUBLICATIONS

Dahlman et al., *5G NR The Next Generation Wireless Access Technology*, Academic Press (2021).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Third Generation Partnership Project, "Technical Specification Group Radio Access Network; NR; Physical layer procedures for control (Release 17)," 3GPP TS 38.213 V17.1.0 (Mar. 2022).

Third Generation Partnership Project, "Technical Specification Group Radio Access Network; NR; Physical layer procedures for control (Release 17)," 3GPP TS 38.213 V17.5.0 (Mar. 2023).

Third Generation Partnership Project, "Technical Specification Group Radio Access Network; NR; Physical layer procedures for control (Release 16)," 3GPP TS 38.213 V16.9.0 (Mar. 2022).

Third Generation Partnership Project, "Technical Specification Group Radio Access Network; NR; Radio Resource Control (RRC) protocol specification (Release 17)," 3GPP TS 38.331 V17.4.0 (Mar. 2023).

Third Generation Partnership Project, "Technical Specification Group Radio Access Network; NR; Radio Resource Control (RRC) protocol specification (Release 17)," 3GPP TS 38.331 V17.0.0 (Mar. 2022).

Third Generation Partnership Project, "Technical Specification Group Radio Access Network; NR; Radio Resource Control (RRC) protocol specification (Release 16)," 3GPP TS 38.331 V16.7.0 (Dec. 2021).

Third Generation Partnership Project, "Technical Specification Group Radio Access Network; NR; Physical layer procedures for data (Release 17)," 3GPP TS 38.214 V17.5.0 (Mar. 2023).

Third Generation Partnership Project, "Technical Specification Group Radio Access Network; NR; Physical layer procedures for data (Release 17)," 3GPP TS 38.214 V17.1.0 (Mar. 2022).

Third Generation Partnership Project, "Technical Specification Group Radio Access Network; NR; Physical layer procedures for data (Release 16)," 3GPP TS 38.214 V16.9.0 (Mar. 2022).

Third Generation Partnership Project, "Technical Specification Group Radio Access Network; NR; Multiplexing and channel coding (Release 17)," 3GPP TS 38.212 V17.5.0 (Mar. 2023).

Third Generation Partnership Project, "Technical Specification Group Radio Access Network; NR; Multiplexing and channel coding (Release 17)," 3GPP TS 38.212 V17.1.0 (Mar. 2022).

Third Generation Partnership Project, "Technical Specification Group Radio Access Network; NR; Multiplexing and channel coding (Release 16)," 3GPP TS 38.212 V16.9.0 (Mar. 2022).

Third Generation Partnership Project, "Technical Specification Group Radio Access Network; NR; Physical channels and modulation (Release 17)," 3GPP TS 38.211 V17.4.0 (Dec. 2022).

Third Generation Partnership Project, "Technical Specification Group Radio Access Network; NR; Physical channels and modulation (Release 16)," 3GPP TS 38.211 V16.9.0 (Mar. 2022).

Third Generation Partnership Project, "Technical Specification Group Radio Access Network; NR; Physical channels and modulation (Release 17)," 3GPP TS 38.211 V17.1.0 (Dec. 2022).

* cited by examiner

Figure 1C:
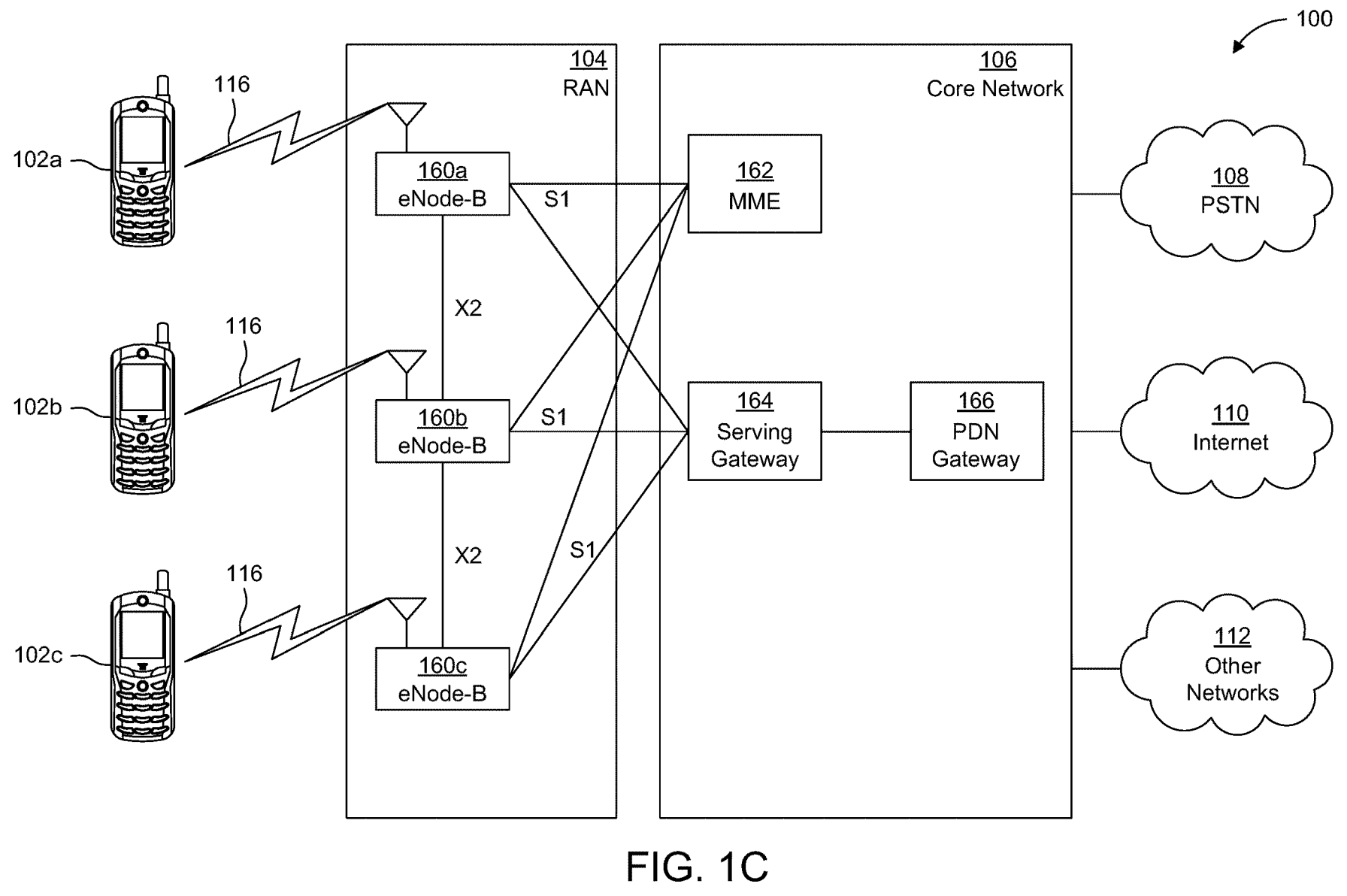

100

108 PSTN

110 Internet

112 Other Networks

106 Core Network

162 MME

164 Serving Gateway

166 PDN Gateway

104 RAN

S1

S1

S1

160a eNode-B

X2

160b eNode-B

X2

160c eNode-B

```
ControlResourceSet ::=              SEQUENCE {
   controlResourceSetId                  ControlResourceSetId,

   frequencyDomainResources              BIT STRING (SIZE (45)),
   duration                              INTEGER (1..maxCoReSetDuration),
   cce-REG-MappingType                   CHOICE {
      interleaved                             SEQUENCE {
         reg-BundleSize                            ENUMERATED {n2, n3, n6},
         interleaverSize                           ENUMERATED {n2, n3, n6},
         shiftIndex                                INTEGER(0..maxNrofPhysicalResourceBlocks-1)
      },
      nonInterleaved                          NULL
   },
   precoderGranularity                   ENUMERATED {sameAsREG-bundle, allContiguousRBs},
   tci-StatesPDCCH-ToAddList             SEQUENCE(SIZE  (1..maxNrofTCI-StatesPDCCH)) OF TCI-StateId
   tci-StatesPDCCH-ToReleaseList         SEQUENCE(SIZE  (1..maxNrofTCI-StatesPDCCH)) OF TCI-StateId
   tci-PresentInDCI                           ENUMERATED {enabled}
   pdcch-DMRS-ScramblingID                    INTEGER (0..65535)
   ...,
   [[
   rb-Offset-r16                         INTEGER (0..5)
   tci-PresentDCI-1-2-r16                INTEGER (1..3)
   coresetPoolIndex-r16                  INTEGER (0..1)
   controlResourceSetId-v1610            ControlResourceSetId-v1610
   ]]
}
```

```
ControlResourceSetId ::=             INTEGER    (0..maxNrofControlResourceSets-1)

ControlResourceSetId-r16 ::=         INTEGER    (0..maxNrofControlResourceSets-1-r16)

ControlResourceSetId-v1610 ::=       INTEGER    (maxNrofControlResourceSets..maxNrofControlResourceSets-1-
r16)

maxNrofControlResourceSets           INTEGER    ::= 12                 -- Max number of CoReSets
configurable on a serving cell

maxNrofControlResourceSets-1         INTEGER    ::= 11                 -- Max number of CoReSets
configurable on a serving cell minus 1

maxNrofControlResourceSets-1-r16     INTEGER    ::= 15                 -- Max number of CoReSets
configurable on a serving cell extended in minus 1
```

CORESET Configuration

FIG. 4 (Continued)

Search Space Configuration

600

```
SearchSpaceExt-r16 ::=                    SEQUENCE {
   controlResourceSetId-r16                  ControlResourceSetId-r16
OPTIONAL,   -- Cond SetupOnly2
   searchSpaceType-r16                       SEQUENCE {
      common-r16                                SEQUENCE {
         dci-Format2-4-r16                         SEQUENCE {
            nrofCandidates-CI-r16                     SEQUENCE {
               aggregationLevel1-r16                     ENUMERATED {n1, n2}
               aggregationLevel2-r16                     ENUMERATED {n1, n2}
               aggregationLevel4-r16                     ENUMERATED {n1, n2}
               aggregationLevel8-r16                     ENUMERATED {n1, n2}
               aggregationLevel16-r16                    ENUMERATED {n1, n2}
            },
            ...
         }
         dci-Format2-5-r16                         SEQUENCE {
            nrofCandidates-IAB-r16                    SEQUENCE {
               aggregationLevel1-r16                     ENUMERATED {n1, n2}
               aggregationLevel2-r16                     ENUMERATED {n1, n2}
               aggregationLevel4-r16                     ENUMERATED {n1, n2}
               aggregationLevel8-r16                     ENUMERATED {n1, n2}
               aggregationLevel16-r16                    ENUMERATED {n1, n2}
```

Search Space Group Configuration

700

```
SPS-Config ::=                     SEQUENCE {
   periodicity                          ENUMERATED {ms10, ms20, ms32, ms40, ms64, ms80, ms128,
ms160, ms320, ms640,
                                                             spare6, spare5, spare4, spare3,
spare2, spare1},
   nrofHARQ-Processes                   INTEGER (1..8),
   n1PUCCH-AN                           PUCCH-ResourceId
   mcs-Table                            ENUMERATED {qam64LowSE}
   ...,
   [[
   sps-ConfigIndex-r16                  SPS-ConfigIndex-r16
   harq-ProcID-Offset-r16               INTEGER (0..15)
   periodicityExt-r16                   INTEGER (1..5120)
   harq-CodebookID-r16                  INTEGER (1..2)
   pdsch-AggregationFactor-r16          ENUMERATED {n1, n2, n4, n8 }
   ]]
}
```

Scheduling and Grant Configuration

FIG. 7

PDCCH ENHANCEMENTS FOR RADAR COEXISTENCE

CROSS-REFERENCE TO RELATED APPLICATIONS

This application claims the benefit of U.S. Provisional Application No. 63/336,651, filed Apr. 29, 2022, the contents of which are incorporated herein by reference.

STATEMENT OF GOVERNMENT INTEREST

This invention was made with government support under project NSC-20-2084: Dynamic Spectrum Sharing 5G networks enhancement prototype, also known as ENhanced SecURity and co-Existence for DoD—5G (ENSURED-5G); OTA Number W15QKN-15-9-1004, Base and Project Agreement 2017-314A-Mod-03, Subcontract 2021-01. The government has certain rights in the invention.

BACKGROUND

Recent trends are driving researchers to create solutions for cellular network deployments in the presence of high-power narrowband interferers (e.g., radars). Although the baseline functionality provided by 5G could be used to provide some level of coexistence with radars, enhancements still be desired to realize the full potential of 5G.

When a narrow-band high power interferer, such as radar, operates in a band that overlaps with the resource blocks (RBs) used by a base station, or relay node, to transmit downlink (DL) control signaling over a downlink control channel, such as a physical downlink control channel (PDCCH), to a wireless transmit receive unit (WTRU), the WTRU may not be able to reliably receive critical downlink control information (DCI). This DCI may include downlink scheduling assignment, uplink grants, slot format indicator for dynamical TDD, and TPC command for the PUSCH/PUCCH/SRS power control. Furthermore, even in scenarios where the DCI can be reliably received by the WTRU in the presence of the interference, there is a potential for the PDCCH DCI transmission to interfere with a proximate radar system, which may also problematic. Therefore, when coexisting with high-power narrowband interferers such as a radar, there is a need for new abilities to ensure that robust and efficient DCI transmission and reception can occur when coexisting with radars

SUMMARY

Aspects of various embodiments may address issues relating to radar or other narrowband interference with downlink control channels in a wireless networks. Certain aspects define multiple PDCCH search space groups to mitigate interference to and from radars. Other aspects may relate to enhanced triggering of PDCCH aggregation level for WTRUs that will incur interference from radars. Additional aspects relate to dynamic switching between semi-persistent and dynamic scheduling to mitigate interference to and from radars and further aspects relate to dynamic suspension of PDCCH CORSETs to mitigate interference to and from radars.

Aspects relate to configuring a WTRU with multiple physical downlink control channel PDCCH control resource sets (CORESETs) including at least a first PDCCH CORESET identifying first frequency resources of a downlink (DL) bandwidth part (BWP) for detection of downlink control information (DCI) and a second PDCCH CORESET identifying second frequency resources of the DL BWP for detection of DCI. The WTRU monitors one or more search spaces linked to active PDCCH CORSETs for transmissions of DCI. On determination that an interferer may impact PDCCH resources, a network sends, and a WTRU receives, signaling to suspend monitoring of search spaces linked to one of the first PDCCH CORSET or the second PDCCH CORESET for a suspend time period. Upon expiration of the suspend time period or sending/receiving unsuspend signaling, the WTRU resumes monitoring search spaces linked to a previously suspended PDCCH CORESET.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 4 is an example for CORSET configuration according to various embodiments;

FIG. 7 is an example for scheduling and grant configuration according to various embodiments

DETAILED DESCRIPTION

Figure 1A:
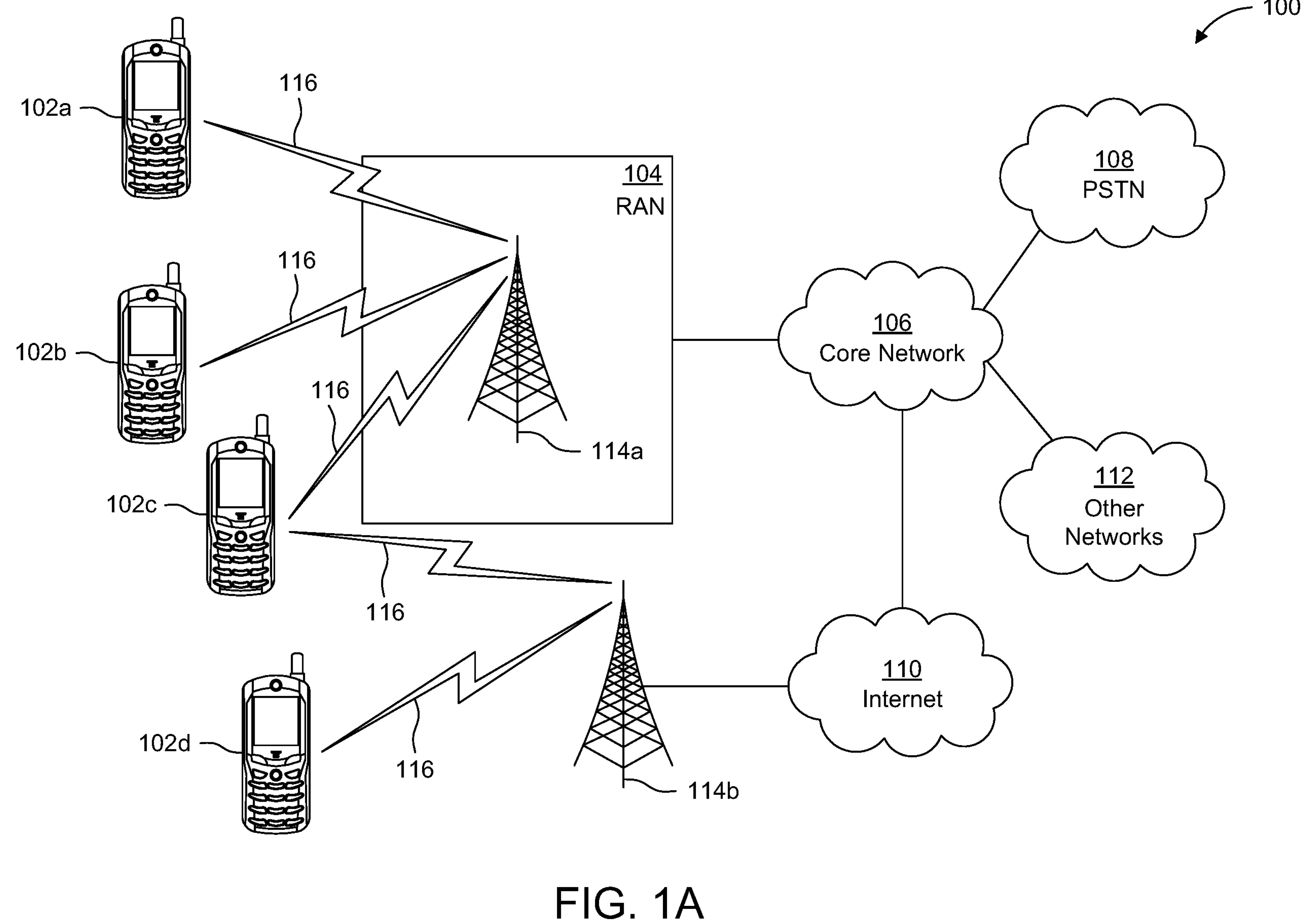
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN).

In an embodiment, the base station **114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106**.

The RAN 104 may be in communication with the CN 106, which may be any type of network configured to provide voice, data, applications, and/or voice over internet protocol (VoIP) services to one or more of the WTRUs **102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106** may also be in communication with another RAN (not shown) employing a GSM, UMTS, CDMA 2000, WiMAX, E-UTRA, or WiFi radio technology.

The CN 106 may also serve as a gateway for the WTRUs **102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104** or a different RAT.

Some or all of the WTRUs **102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b***, which may employ an IEEE 802 radio technology.

Figure 1B:
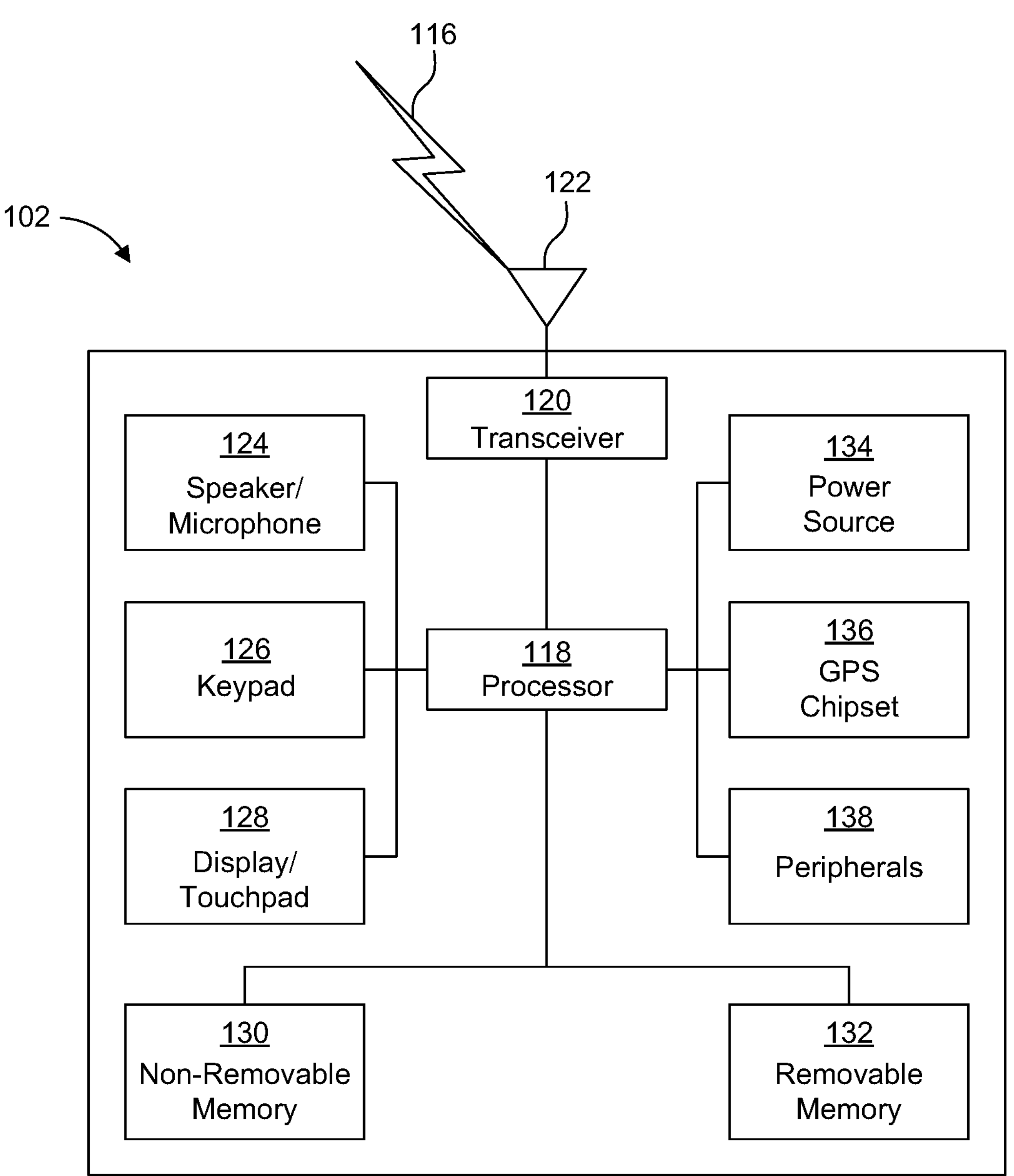
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station **114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122** may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 102 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
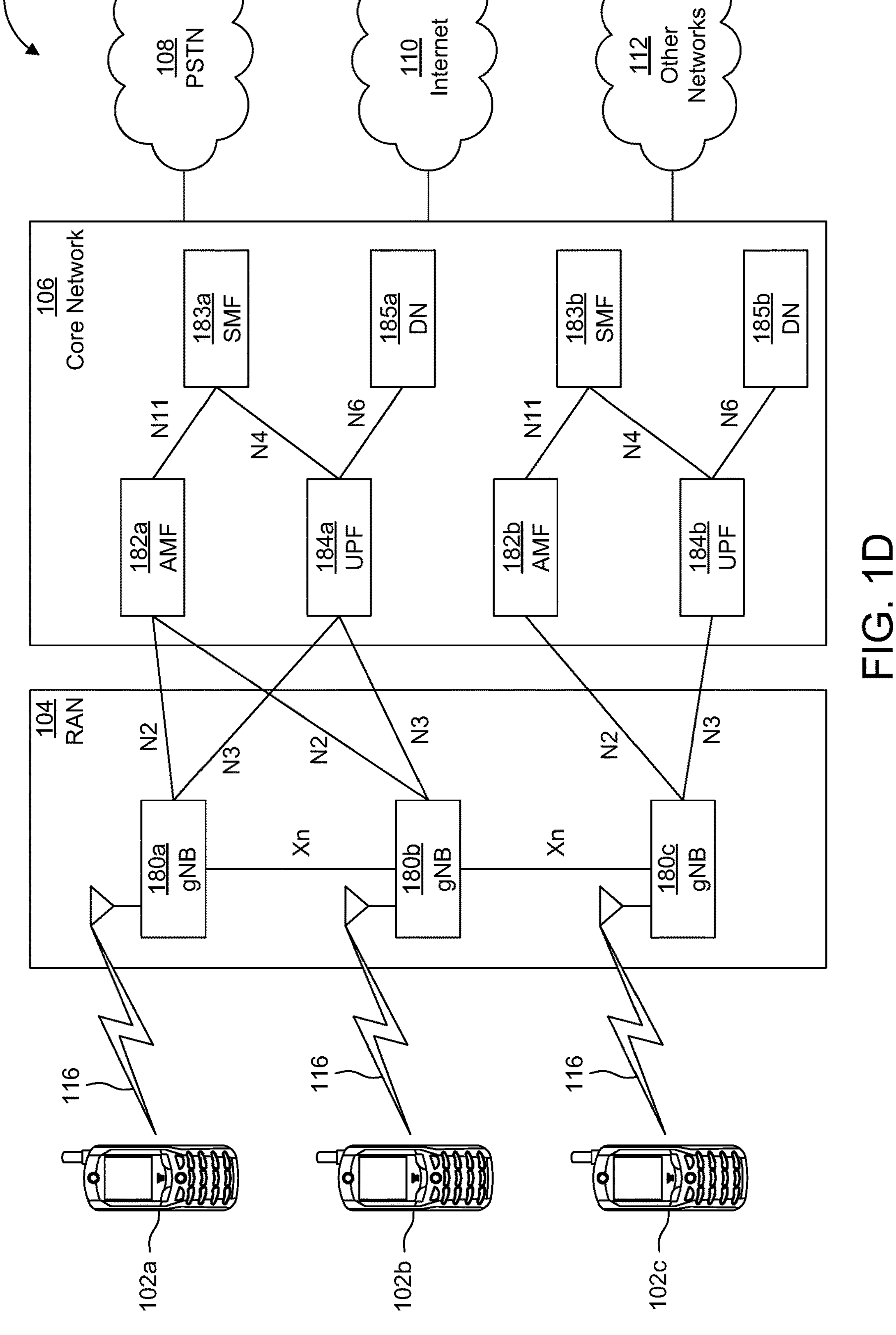
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162 SGW 164 PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
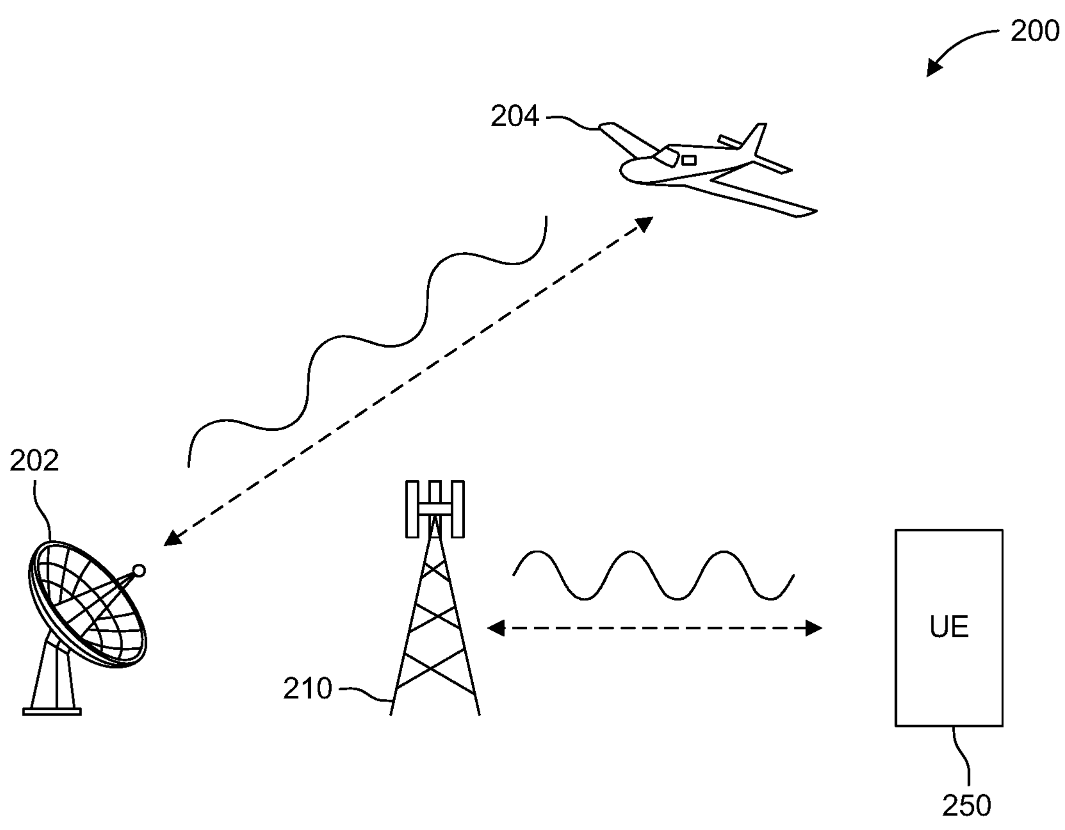
FIG. 2 is a diagram depicting a potential scenario of a wireless network encountering interference from radar.

Referring to FIG. 2, an example potential interference scenario 200 is shown where communications between a base station 210 and a remote WTRU 250 may be adversely impacted by the presence of narrowband interferers, such as radar station 202 and/or radar on plane 204 (or reflections therefrom). The example embodiments that follow, address potential interference avoidance and mitigation solutions for downlink (DL) communications, i.e., from base station 210 to WTRU 250.

A physical downlink control channel (PDCCH) Control Resource Set (CORESET) is defined as a set of contiguous or distributed physical resource blocks (PRBs) configured using a 6-PRB granularity, within which the WTRU searches and attempts to blindly decode the downlink control information (DCI) present in a downlink channel. A CORESET consists of groups of 6-PRBs in the frequency domain and a minimum 1-OFDM symbols in time domain (up to a max of 3-OFDM symbols can currently be allocated). A mapping exists between a CORESET and search spaces and a CORSET may have multiple search spaces. It is the search space where a WTRU attempts the blind decoding and each search space is defined by a set of control channel elements (CCEs) at different aggregations level(s). That is, a search space tells how many PDCCH candidates there are to decode at a different aggregation level, where an aggregation level is the number of resource elements (RE's) of a CORESET that are required to carry a PDCCH DCI message. The aggregation level is expressed in terms of CCE's and the number of CCE's per aggregation level are matched one-to-one.

Figure 3:
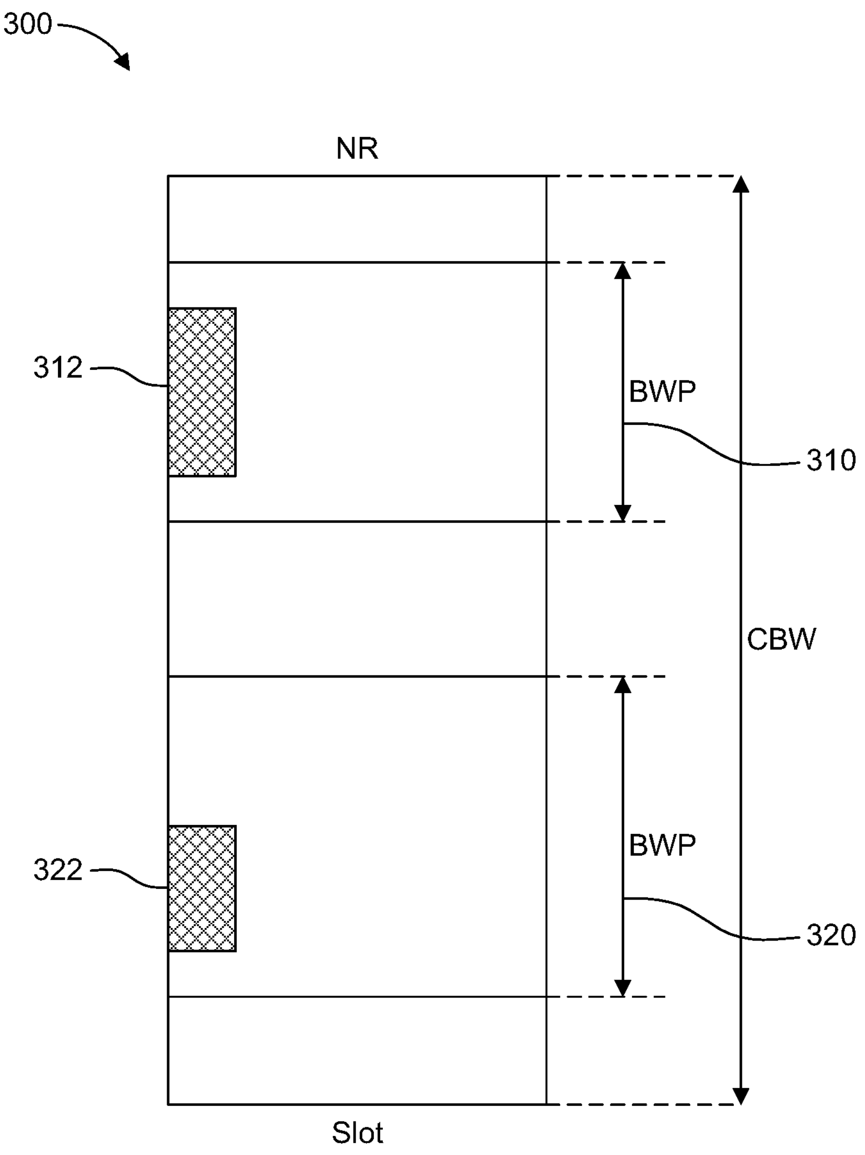
FIG. 3 is an example representation of a new radio (NR) slot including control resource sets (CORSETs)

Referring to FIG. 3, an example representation of a NR slot 300 is shown including CORESETS 312 and 322 in differing respective bandwidth parts (BWPs) 310 and 320 within channel bandwidth (CBW). The network may define a common control region (shared by WTRUs) and WTRU-specific control regions for CORSETs.

In FIG. 4 an example CORSET configuration 400 is shown. For each CORESET in the downlink BWP of a serving cell, the radio resource control (RRC) parameter frequencyDomainResources provides a bitmap, whose bits have a one-to-one correspondence with non-overlapping groups of 6-PRBs, in ascending order of the PRB index in the downlink BWP bandwidth of $$N_{RB}^{BWP}$$

with starting position $$N_{start}^{BWP}.$$

A group of 6-PRBs are allocated to a CORESET if the corresponding bit values in the bitmap is set to one. In the time domain, presently, a CORSET may span 1-3 contiguous OFDM symbol(s), defined by the RRC parameter duration in the ControlResourceSet information element (IE). The ControlResourceSet IE is signaled to the WTRU via broadcast system information (SI) (for common CORESET) or WTRU specific RRC signaling (for WTRU-specific CORESET).

The control channel element (CCE) consists of 6-resource element (RE) groups (REGs) where one REG is equivalent to one RB (12-subcarriers×1 OFDM symbol=12 REs). One aggregation level corresponds to one CCE, with 6-REGs and each REG having 12-REs, provides a total of 72-REs. Each REG carrying the PDCCH includes its own demodulation reference signal (DMRS). Of the 72-REs in a CCE, 54-REs are used for the PDCCH and 18-REs are used for DMRS. The CCE size is designed such that at least one WTRU-specific DCI can be transmitted within one CCE with lower code rates. The REGs within a CORESET are numbered in increasing order in a time first manner, starting with "0" for the first OFDM symbol and the lowest numbered resource block in the CORESET.

For each CORESET, there is an associated CCE-to-REG mapping based on the REG bundle. A REG bundle comprises of 2, 3, or 6-REGs across which the device can assume the precoding is a constant. Channel estimation must be performed per REG bundle, as the network may change precoding across REG bundles. The CCE-to-REG mapping can be interleaved or non-interleaved (as configured by the RRC parameter cce-REG-MappingType in the ControlResourceSet IE, and is described by REG bundles), depending on the characteristics of the transmission channel; that is, frequency flat or frequency selective fading channel. The REG bundle is the interleaving unit for the distributed REG mapping. There is only one CCE-to-REG mapping for a given CORESET. Multiple CORESETs can be configured with different mappings.

The PDCCH control channels are formed by the aggregation of control channel elements as previously mentioned. Five different aggregation levels corresponding to 1, 2, 4, 8, and 16-CCEs can be configured in NR Rel-15. Different coding rates for control elements are realized by aggregating different number of CCEs. The PDCCHs are transmitted in one or more CORESETs. When a device enters the connected state, it has already obtained the information from the physical broadcast channel (PBCH) about the common CORESET where it can find the control channel used to schedule the remaining minimum system information (RMSI). The CORESET configuration obtained from the PBCH also defines and activates the initial bandwidth part in the downlink. The initial uplink bandwidth part is obtained from the SI scheduled using the downlink PDCCH.

A WTRU specific PDCCH is used to schedule downlink and uplink transmissions on the shared channels, e.g., PDSCH and PUSCH, respectively. The DCI on PDCCH contains downlink assignments generally including modulation and coding format, resource allocation, and hybrid automatic repeat request (HARQ) transmission related to DL-SCH; uplink scheduling grants including modulation and coding format, resource allocation, and HARQ information related to UL-SCH.

Various parameters of FIG. 4 CORSET configuration 400 are described below, including:

cce-REG-MappingType: mapping of Control Channel Elements (CCE) to Resource Element Groups (REG);

ControlResourceSet: identifies the instance of the ControlResourceSet IE. Value=0 identifies the common CORESET configured in MIB and in ServingCellConfigCommon (controlResourceSetZero) and is hence not used here in the ControlResourceSet IE. Other values identify CORESETs configured by dedicated signalling or in SIB1. The controlResourceSetId is unique among the BWPs of a serving cell. If the field controlResourceSetId-v1610 is present, the WTRU ignores the controlResourceSetId field (without suffix);

duration: contiguous time duration of the CORESET in number of symbols;

frequencyDomainResources: frequency domain resources for the CORESET. Each bit corresponds a group of 6-RBs, with grouping starting from the first RB group in the BWP. When at least one search space is configured with freqMonitorLocation-r16, only the first $$N_{RBG,set0}^{size}$$

bits are valid. The first (left-most/most significant) bit corresponds to the first RB group in the BWP, and so on. A bit that is set=1 indicates that this RB group belongs to the frequency domain resource of this CORESET. Bits corresponding to a group of RBs not fully contained in the bandwidth part within which the CORESET is configured are set to zero;

interleaverSize: interleaver-size;

pdcch-DMRS-ScramblingID: PDCCH DMRS scrambling initialization. When the field is absent the WTRU applies the value of the physCellId configured for this serving cell;

precoderGranularity: precoder granularity in frequency domain;

rb-Offset: indicates the RB level offset in units of RB from the first RB of the first 6RB group to the first RB of BWP;

reg-BundleSize: Resource Element Groups (REGs) that can be bundled to create REG bundles and this parameter defines the size of such bundles; and/or tci-StatesPDCCH-ToAddList: a subset of the TCI states defined in pdsch-Config included in the BWP-DownlinkDedicated corresponding to the serving cell and to the DL BWP to which the ControlResourceSet belongs. They are used for providing quasi co-location (QCL) relationships between the DL RS(s) in one RS Set (TCI-State) and the PDCCH DMRS ports. The network configures at most maxNro*f* TCI-StatesPDCCH entries.

coresetPoolIndex; the index of the CORESET pool for this CORESET as specified in TS 38.213 (clauses 9 and 10) and TS 38.214 (clauses 5.1 and 6.1). If the field is absent, the UE applies the value 0.

Figure 5:
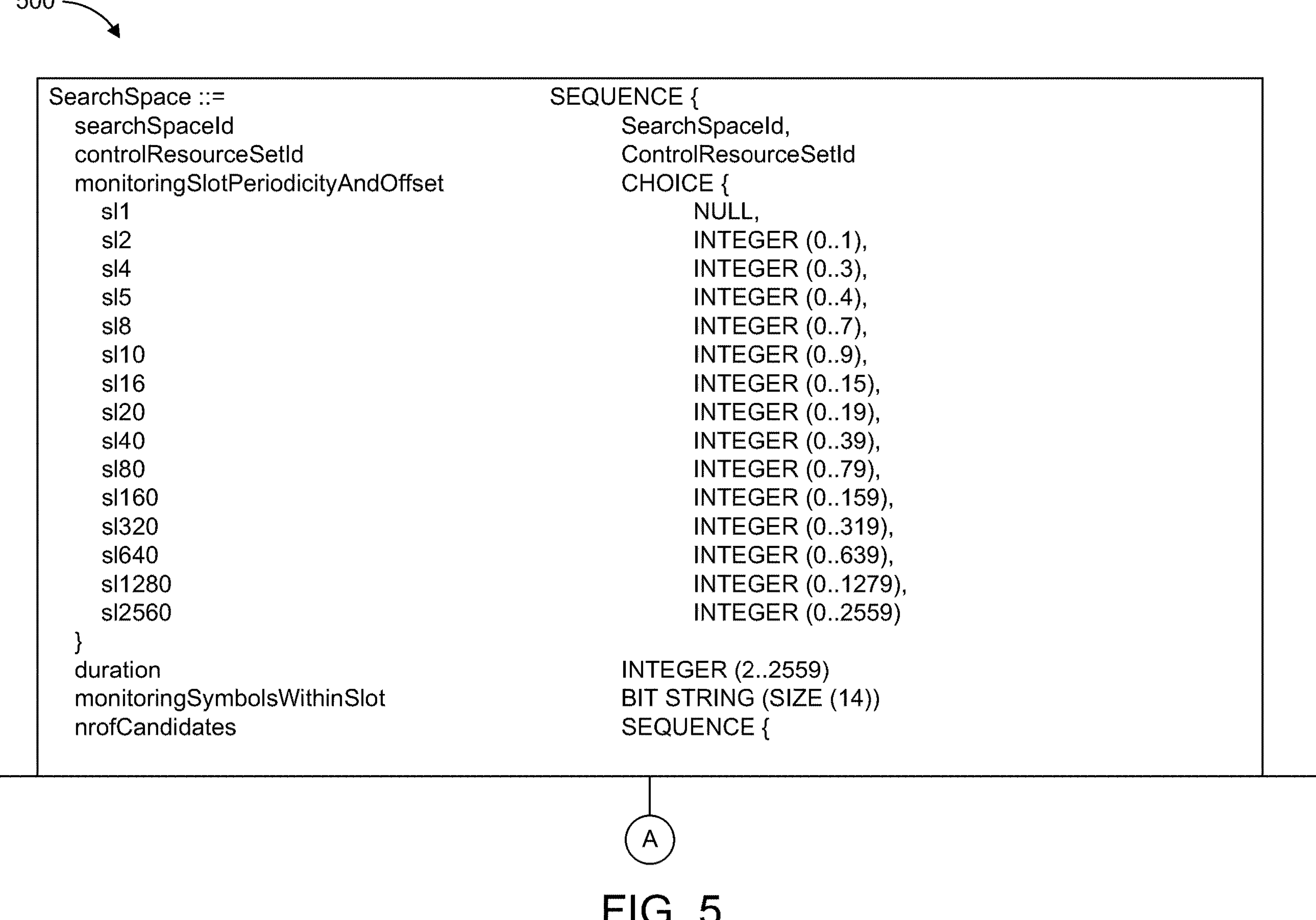
FIG. 5 is an example for search space configuration according to various embodiments.
Figure 5:
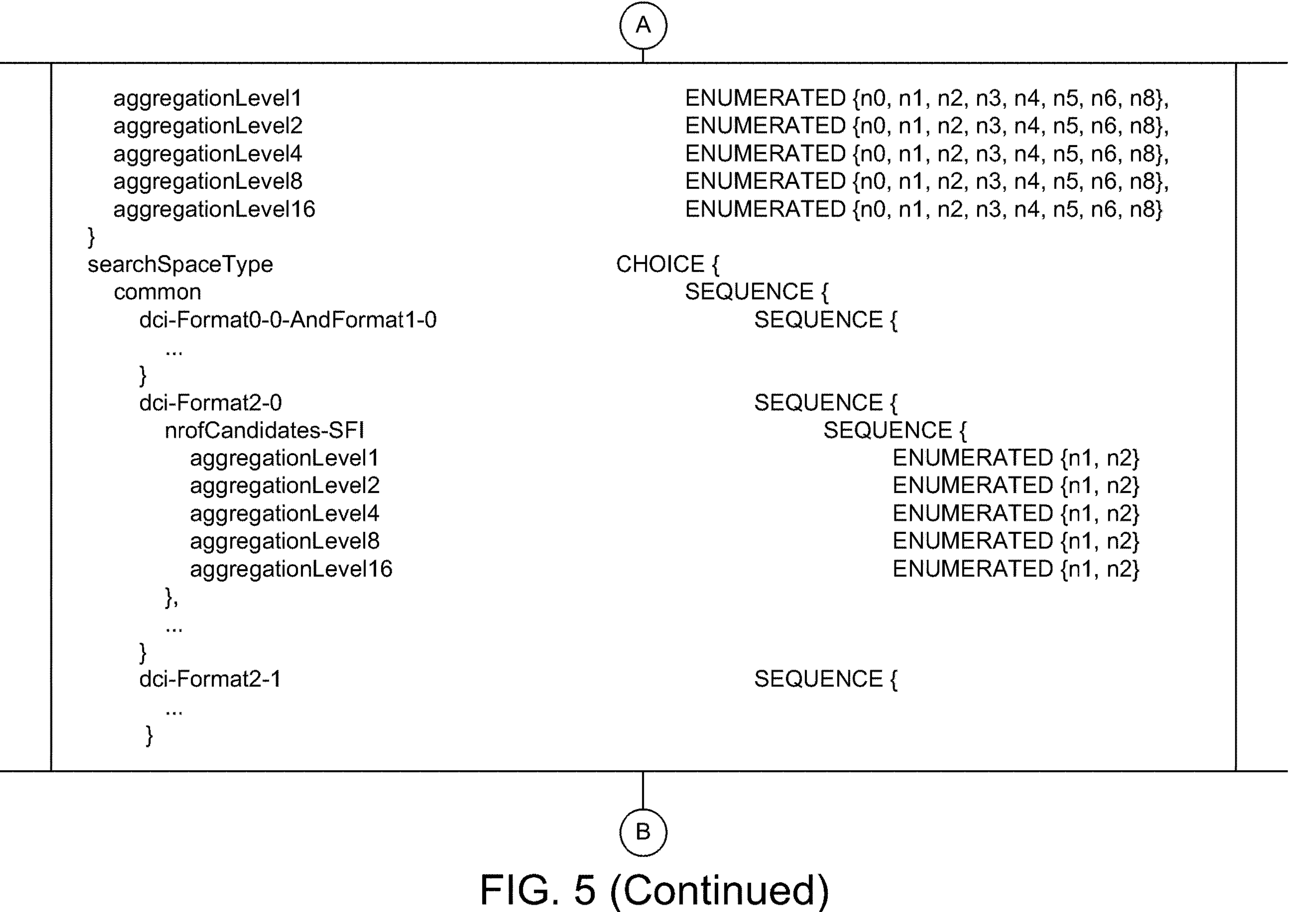
Figure 5:
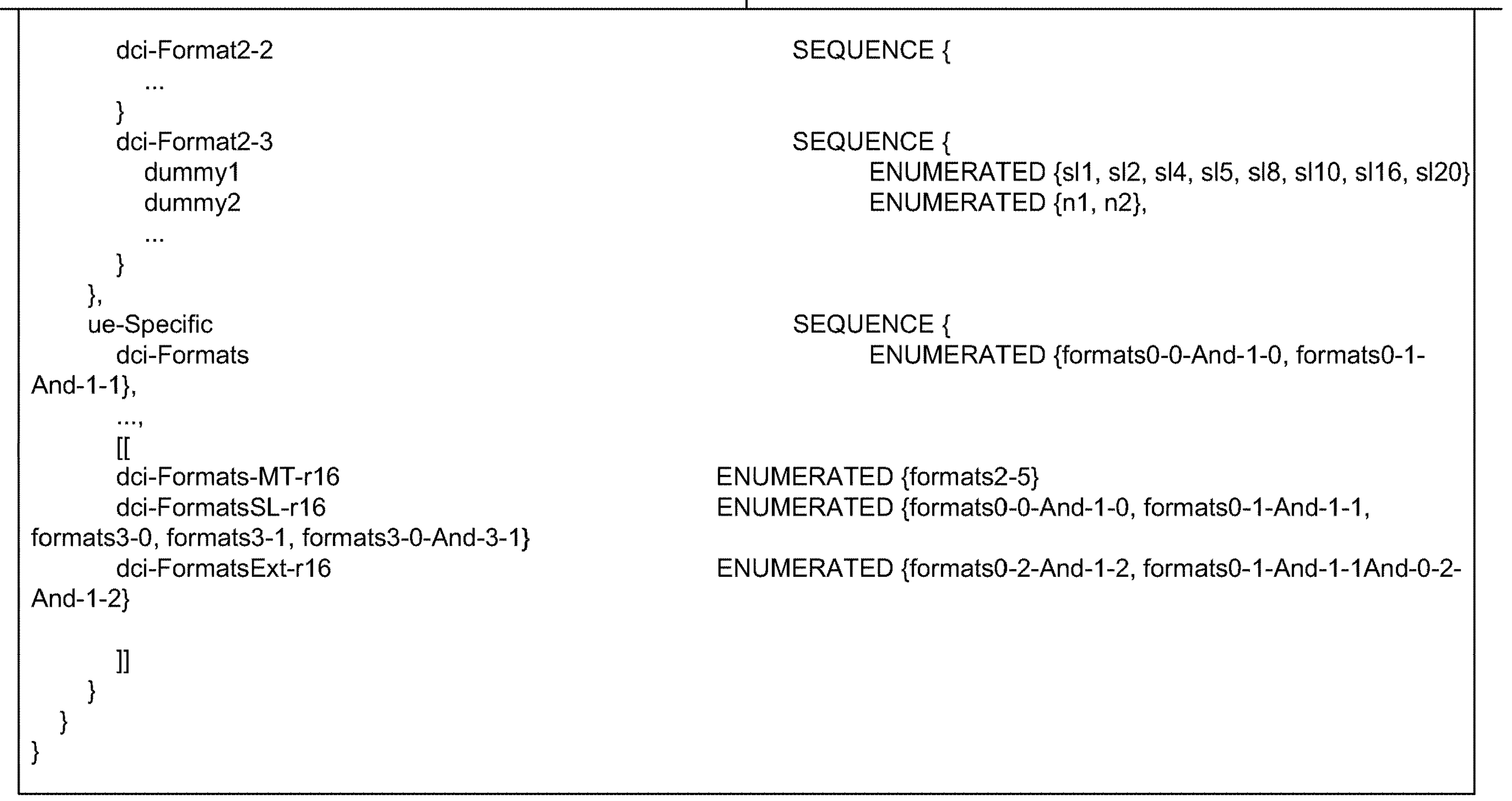

The PDCCH Search Space is a set of candidate control channels including a set of CCEs at a given aggregation level (1, 2, 4, 8, or 16), which the device is instructed to monitor and decode. A search space in NR Rel-15 is associated or linked with a single CORESET. The number of PDCCH candidates can be configured per search space and per aggregation level. A device can have multiple search spaces due to the multiple aggregation levels. There can be multiple search spaces using the same CORESET or multiple CORESETs configured for a device. FIG. 5 shows an example search space configuration 500. At a configured monitoring occasion for a search space, the device will attempt to decode the candidate PDCCHs for that search space. The concept of PDCCH monitoring periodicity is defined per search space set and is not configured at the CORESET level. Every configured search space with a certain monitoring periodicity (in terms of slots and starting symbols within the monitored slots) is associated with a CORESET.

The gNB addresses a WTRU if the corresponding control information is transmitted via a PDCCH formed by the CCEs in one of the WTRU's search spaces. Each device in the system can be configured with one or more WTRU specific search spaces. The WTRU specific search spaces for PDCCH are defined without explicit signalling and based on the device unique identity in the cell in the connected mode, i.e., cell radio network temporary identifier (C-RNTI). In each of these search spaces, the WTRU attempt to decode the PDCCHs using the WTRU specific C-RNTI. There is also information intended for a group of WTRUs in a cell. These messages are scheduled with different predefined radio network temporary identifiers (RNTIs). For example, system information (SI-RNTI) is for scheduling system information, paging (P-RNTI) is for transmission of a paging message, random access (RA-RNTI) is for transmission of the random-access response, transmit power control (TPC-RNTI) is for uplink power control, interruption (INT-RNTI) is for pre-emption indication, and SFI-RNTI for slot format configuration. The common search space is used for these types of information. A common search space is similar in structure to a WTRU specific search space with the difference that the set of CCEs is predefined and known to all devices, irrespective of their own identity.

An NR WTRU needs to monitor the PDCCH candidates at multiple aggregation levels (ALs) for the detection and reception of PDCCH. Inside a configured CORESET, the NR search space defines the PDCCH candidates of each AL. NR PDCCH employs DM-RS based transmission. For PDCCH DM-RS in a CORESET, the antenna port QCL configuration relating to the SS/PBCH block antenna port(s) or configured CSI-RS antenna port(s), is on a per CORESET basis.

For each downlink BWP configured for a WTRU in the serving cell, the WTRU can be configured up to 3-CORESETs. For each CORESET, the RRC signalling provides the WTRU with a CORESET index $0 \le p < 12$ in Rel-15; a DM-RS scrambling sequence initialization value; a precoder granularity for a number of REGs in the frequency domain where the WTRU can assume use of a same DM-RS precoder; a number of consecutive symbols; a set of resource blocks; CCE-to-REG mapping parameters; an antenna port QCL (from a set of antenna port QCLs, indicating QCL information of the DM-RS antenna port for PDCCH reception in a respective CORESET); and an indication for the presence or absence of TCI field in DCI format 1_1 transmitted by PDCCH in the CORESET.

FIG. 5 shows an example configuration 500 for CORSET search spaces. For each downlink BWP configured for a WTRU in a serving cell, the WTRU is provided with $S \le 10$ search space sets via RRC signalling. For each search space set, the WTRU is provided with a search space set index $0 \le s < 40$; an association between the search space set s and a CORSET p; a PDCCH monitoring periodicity of $k_{p,s}$ slots and PDCCH offsets of $\delta_{p,s}$ slots; a PDCCH monitoring pattern within a slot, indicating first symbols of the CORESET within a slot for PDCCH monitoring; a number of PDCCH candidates $M_{p,s,L}$ per CCE aggregation level L; and an indication that search space set s is either a common or WTRU specific search space set via RRC signalling. The WTRU can also be provided with a time interval consisting of $T_{p,s} < k_{p,s}$ slots indicating a number of slots where the search space set could exist.

The WTRU determines the PDCCH monitoring occasion from the PDCCH monitoring periodicity, offset, and pattern within a slot. For search space set s in CORESET p, the WTRU determines the PDCCH monitoring occasion(s) in slot $n_{slot}$ and frame $n_{frame}$ if $$(n_{frame}N_{frame}^{slot}+n_{slot}-\delta_{p,s})\bmod k_{p,s}=0.$$

If the WTRU is informed in advance of the duration via RRC signalling, it would monitor PDCCH for search space set s in CORSET p for $T_{p,s}$ consecutive slots, starting from slot $n_{start}$.

If the WTRU receives the initial configuration of more than one TCI state through RRC parameter TCI-States but has not received a MAC-CE activation command for at least one of the TCI states, the WTRU can assume that the DM-RS antenna port associated with PDCCH reception in the WTRU specific search space is quasi-co-located with the SS/PBCH block used during the initial access procedure. If the WTRU has received a MAC CE activation command for at least for one of the TCI states, it applies the activation command 3 ms after the slot where it transmits HARQ-ACK information for the PDSCH providing the MAC activation command.

Figure 6A:
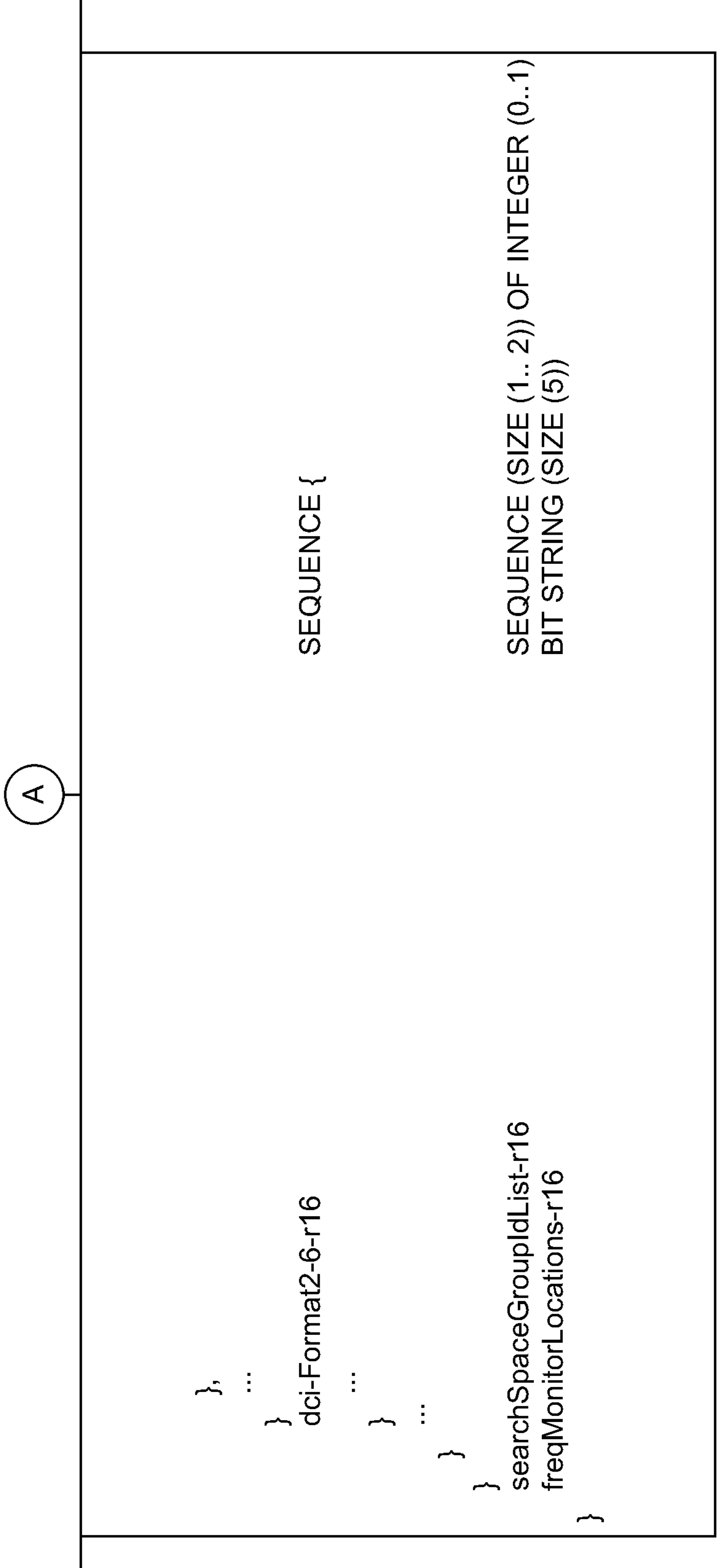
FIG. 6A is an example for search space group configuration according to various embodiments.

Referring to FIG. 6A, an example configuration 600 for PDCCH Search Space Groups is shown. In 3GPP Rel-16, blind decoding follows the same search space principle as in Rel-15 with the addition of up to two search space groups for device-specific search spaces (search space groups are not used for common search spaces). If two search space groups are configured, each search space is part of one or both search space groups. One of the groups is active and the device switches between groups either explicitly based on dynamic group-common signaling or implicitly based on detection of PDCCH in one of the groups. Both approaches make use of a timer to switch back to a default group. The parameter searchSpaceGroupIdList is a list of search space group IDs for which the search space is associated. The network configures at most two search space groups per BWP in R16 where the group ID is either =0 or =1.

The 3GPP RAN working group (WG) 1 specified the physical layer methods to support non-coherent joint transmissions (NCJT) from multiple transmission reception points (TRPs), i.e., base stations, or base station panels in 5G NR standards starting from R16. A WTRU/UE may receive physical downlink shared channel (PDSCH) transmission(s) that are multiplexed in space, time or frequency using two different reception settings, wherein each reception setting may correspond to a different TRP or base station panel. Independent scheduling (via separate DCIs) of simultaneous PDSCH receptions from different TRPs within a cell, repetition of a PDSCH transmission from different transmission reception points (TRPs) and PDSCH diversity (via a single DCI)—a single PDSCH transmission is received in parts from multiple TRPs—are supported in R16. With enhancements targeting both cell-edge throughput and reliability, multi-TRP operation was exploited only for the PDSCH in R16.

In the case of multi-DCI multiple TRP transmission, different TRPs can use different CORESET pools to transmit PDCCHs. CORESETs in different CORESET pools are distinguished by different CORESET pool indexes (CORESETPoolIndex). For a CORESET without a CORESETPoolIndex configured, the WTRU assumes its CORESETPoolIndex is=0 by default. The PDCCH is scheduled by PDCCHs in CORESETs with different CORESETPoolIndex values will use different PDSCH scrambling sequences to randomize the interference between PDSCHs from different TRPs. To support the increased DCI demand for multi-DCI multiple TRP transmission, a WTRU can be configured with up to 5-CORESETs on each BWP in R16, and the specific number of CORESETs that can be configured depends on the capability of the WTRU.

R17 extends multiTRP-based reliability and robustness enhancements to PDCCH, PUSCH and PUCCH. The single-DCI multi-TRP reliability enhancements for PDCCH (or PDCCH repetition) can be categorized according to the two possible deployment types: single-frequency network (SFN) and non-SFN. PDCCH enhancement in SFN deployments entails the transmission of the same PDCCH from different TRPs or panels on identical time and frequency resources. In the 5G NR context, this implies the transmission of a PDCCH on a given PDCCH candidate in a search space from multiple TRPs or panels with identical PDCCH DMRS configuration, positions and sequences used by all the TRPs or panels. The WTRU is provided with multiple reception settings, i.e., Transmission Configuration Indication (TCI) States, for the reception of the PDCCH candidate simultaneously from multiple TRPs. The reference RS in each TCI-state may be associated with a different TRP to implicitly configure multi-TRP reception at the WTRU. No explicit specification of configurations or parameters are thus required to identify the TRPs transmitting to the WTRU. This transmission scheme is supported in R17 by enabling the assignment of a CORESET with multiple TCI-states. However, this scheme poses stringent synchronization requirements among the TRPs as the repetitions should be received on the same resources in time and frequency at the UE.

In the case of non-SFN deployments, the PDCCH repetitions are multiplexed in time and/or frequency via multiple TRPs. As an example, the PDCCHs generated from a given DCI are repeated in full for two different PDCCH candidates. By associating the PDCCH candidates with different TCI-states, each corresponding to a different TRP, multi-TRP transmission of the repetitions is enabled. Assigning identical TCI-state to the repetitions leads to single-TRP-based repetition. This scheme does not require stringent time synchronization as in the case of SFN.

In R17, a search space can be linked with another search space via a higher layer configuration, where both search spaces have an identical number of PDCCH candidates. The linked search spaces also comprise an identical number of PDCCH candidates for a given aggregation level (AL). A PDCCH candidate of AL L with a given index in a first search space is associated with a PDCCH candidate of identical AL and index in the linked second search space for PDCCH repetition. A further restriction that the PDCCHs on any two linked PDCCH candidates are identical is also specified in R17. The repetition is performed with an identical DCI payload (CRC-attached DCI that is encoded), polar encoding settings, interleaving and rate-matched bits. The 3GPP specifications allow the association of a CORESET with only one TCI-state for this method. If two linked search spaces are transmitted on different CORESETs, the PDCCH repetition is enabled from one or multiple TRPs/panels at the WTRU transparently by assigning the CORESETs to the same or different TCI-states, respectively. On the other hand, if the linked search spaces are from a single CORESET, the TCI-state indicated for the CORESET applies to both linked search spaces, allowing only for single-TRP/panel-based PDCCH repetition.

Figure 6B:
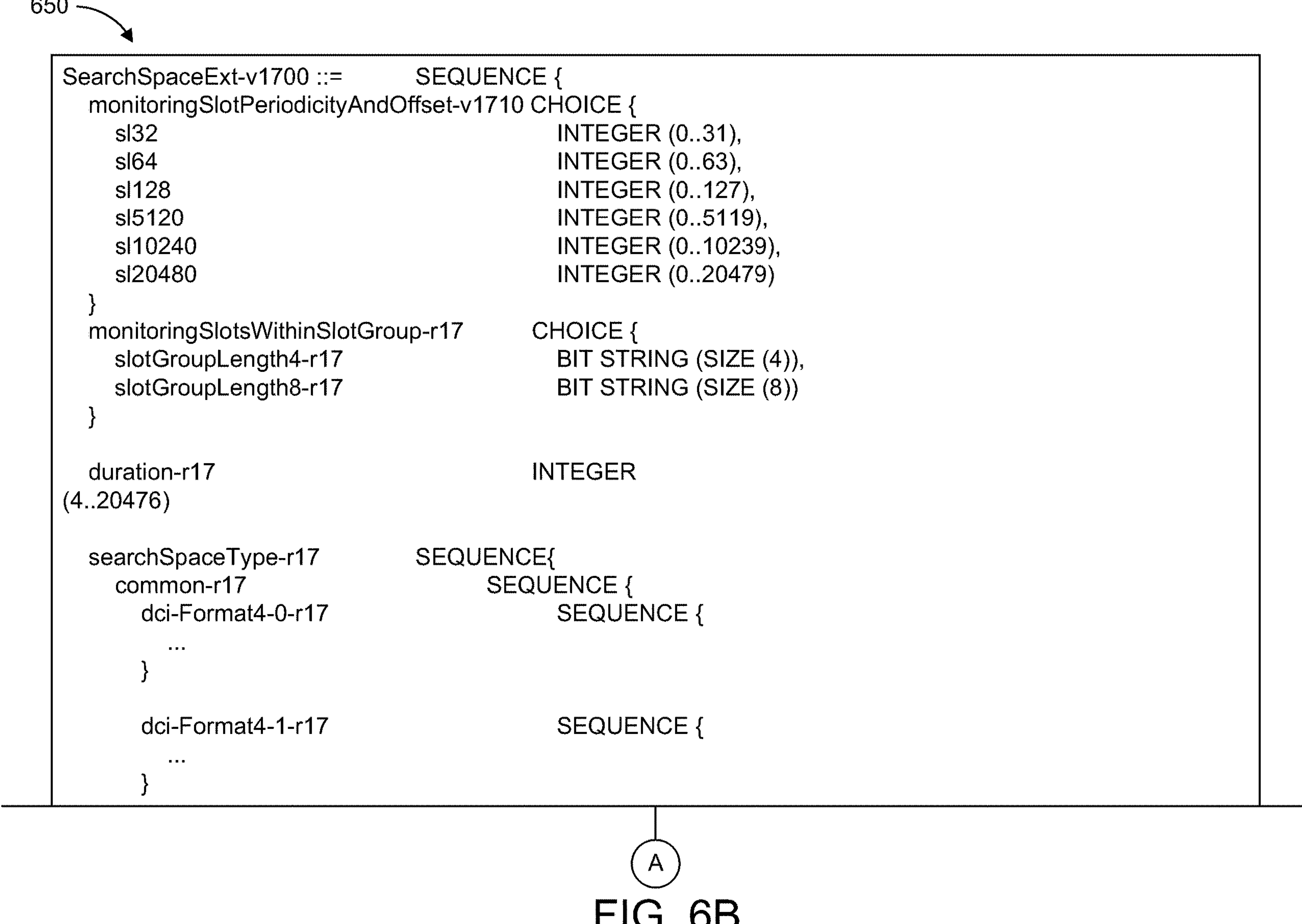
FIG. 6B is an example of search space linking configuration according to embodiments.
Figure 6B:
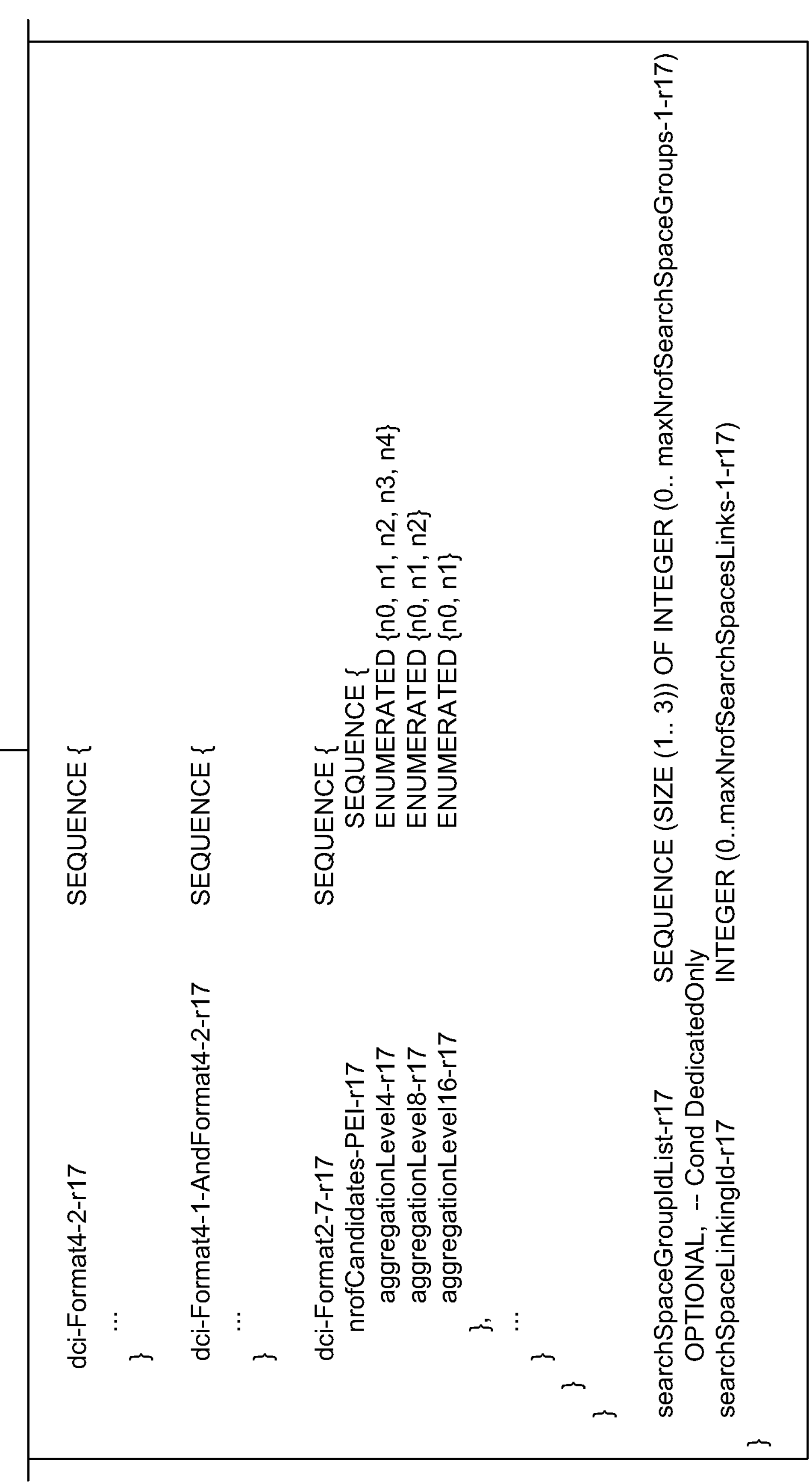

Referring to FIG. 6B, an example of configuration information 650 for linking of search spaces is shown where linking between search spaces in the context of PDCCH repetition may be configured. In this example, a parameter SearchSpaceLinkingId may be used as follows:

SearchSpaceLinkingId: This parameter is used to link two search spaces of same type in the same BWP. If two search spaces have the same SearchSpaceLinkingId a WTRU assumes these search spaces are linked to PDCCH repetition REF. When PDCCH repetition is monitored in two linked search space (SS) sets, the WTRU does not expect a third monitored SS set to be linked with any of the two linked SS sets. The two linked SS sets have the same SS set type (USS/CSS). The two linked SS sets have the same DCI formats to monitor. For intra-slot PDCCH repetition, the two SS sets should have the same periodicity and offset (monitoringSlotPeriodicityAndOffset), and the same duration. For linking monitoring occasions across the two SS sets that exist in the same slot: The two SS sets have the same number of monitoring occasions within a slot and n-th monitoring occasion of one SS set is linked to n-th monitoring occasion of the other SS set. The following SS sets cannot be linked with another SS set for PDCCH repetition: SS set=0, searchSpaceSIB1, searchSpaceOtherSystemInformation, pagingSearchSpace, ra-SearchSpace, searchSpaceMCCH, searchSpaceMTCH, peiSearchSpace, and sdt-SearchSpace. A SS set configured by recoverySearchSpaceId cannot be linked to another SS set for PDCCH repetition. When a scheduled serving cell is configured to be cross-carrier scheduled by a scheduling serving cell, two PDCCH candidates (with the same AL and candidate index associated with the scheduled serving cell) are linked only if the corresponding two SS sets in the scheduling serving cell are linked and two SS sets in the scheduled serving cell with the same SS set IDs are also linked. This parameter is not applicable to search space configured with dci-FormatsSL for monitoring DCI format 3-0 or format 3-1 or for monitoring formats 3-0 and format 3-1 together.

Figure 8:
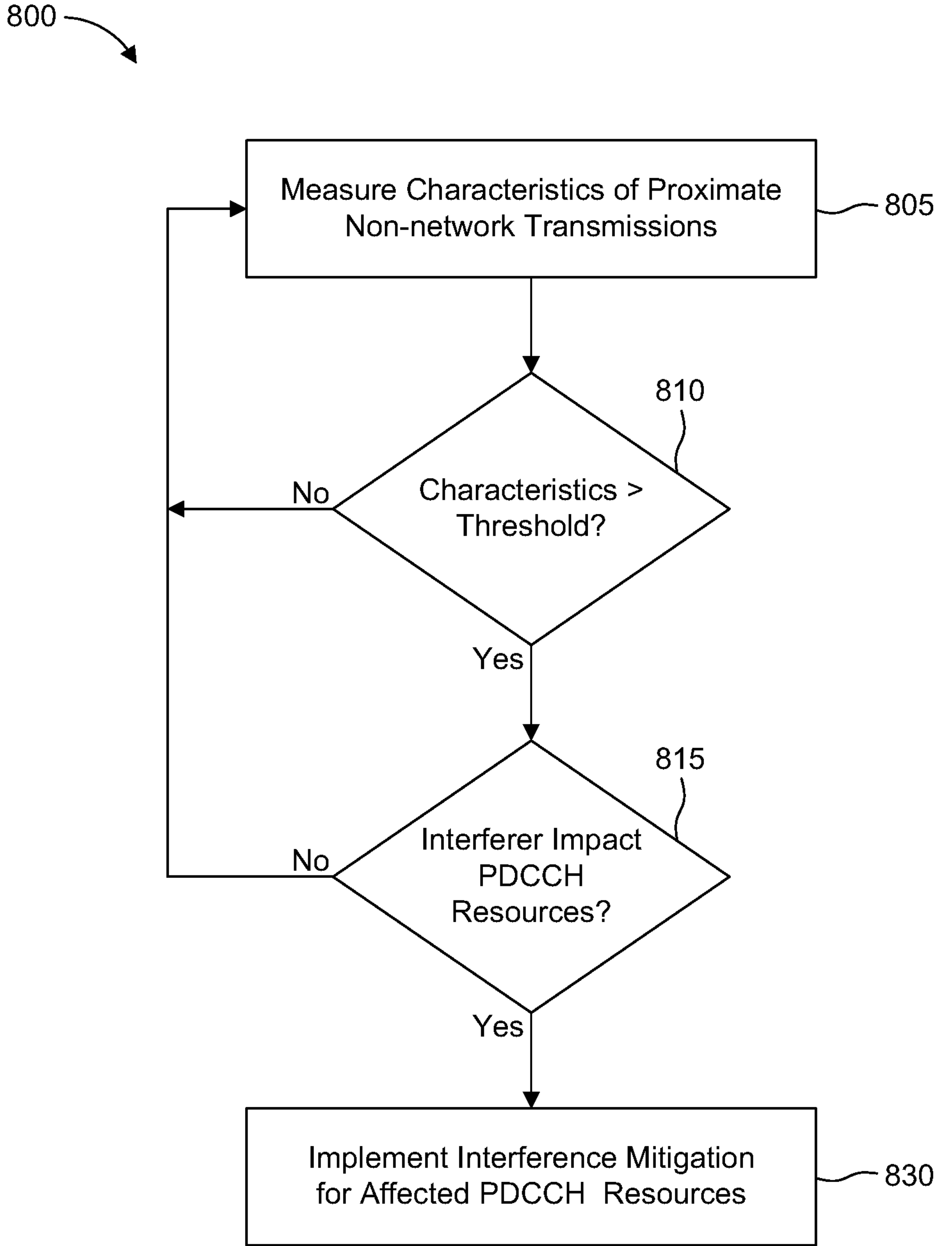
FIG. 8 is a flow diagram showing an example method of detecting interferers and implementing a downlink control channel mitigation method according to an embodiment.

In FIGS. 7-8, configurations 700 and 800 for respective Semi-Persistent Scheduling and Configured Grants are shown. On the downlink, semi-persistent scheduling is supported where the device is configured with a periodicity of the data transmissions using RRC signaling. Activation/deactivation of semi-persistent scheduling is done in the PDCCH using configured scheduling (CS-RNTI) rather than C-RNTI. The PDCCH also carries the necessary information in terms of time-frequency resources and other parameters in a similar way as dynamic scheduling. Upon activation of semi-persistent scheduling, the device receives data transmissions periodically according to the RRC configured periodicity using the transmission parameters indicated on the PDCCH activating the transmission. Hence, the control signaling is only used once and the overhead is reduced.

After enabling semi-persistent scheduling, the device continues to monitor the set of candidate PDCCHs for uplink and downlink scheduling commands. This is useful in the case that there are occasional transmissions of large amounts of data for which the semi-persistent allocation is not sufficient. The PDCCH is also used to handle the dynamically scheduled HARQ retransmissions.

On the uplink, configured grants are used to handle transmissions without a dynamic grant. Two types of configured grants are supported. A Type-1 configured grant sets all the transmission parameters, including periodicity, time offset, and frequency resources as well as modulation and coding scheme of possible uplink transmissions, using RRC signaling. Upon receiving RRC configuration, the device can start using the configured grants for transmission in the time instance given by the periodicity and offset.

The Type-2 configured grant is similar to downlink semi-persistent scheduling. RRC signaling is used to configure the periodicity, while the transmission parameters are provided as part of the activation using the PDCCH. Upon receiving the activation command, the device transmits according to the preconfigured periodicity if there is data in the buffer. If there is no data to transmit, the device will not transmit anything, similar to Type-1. No time offset is needed in this case as the activation time is well defined by the PDCCH transmission instance. The device acknowledges the activation/deactivation of the configured grant Type-2 by sending a MAC control element (MAC-CE) in the uplink link. The benefits of the configured grants may include reduced control signaling overhead, and to some extent, reduced latency, as no scheduling request is needed prior to data transmission.

Since there is no dynamic scheduling of the HARQ process number for semi-persistent scheduling and configured grants, the process number to use should be derived. This is done by linking the process number to the absolute slot number (downlink semi-persistent scheduling) or symbol number (uplink configured grants) within the configured periodicity. Thus, the device and the gNB have the same understanding of the HARQ process number.

As previously mentioned with respect to FIG. 2, when a narrow-band high power interferer such as radar operates in a band that overlaps with the RBs used by the WTRU to receive downlink control signaling over the PDCCH, the WTRU may not reliably receive critical downlink control information (DCI), such as the downlink scheduling assignment, uplink grants, slot format indicator for dynamical TDD, and TPC command for the PUSCH/PUCCH/SRS power control.

Embodiments herein may help ensure robust and efficient PDCCH transmission and reception can occur when coexisting with radars. In certain embodiments, multiple PDCCH search space groups are defined to mitigate interference to and from radars. In additional embodiments, enhanced triggering of PDCCH aggregation level may be used for WTRUs that will incur interference from radars. In further embodiments, dynamic switching between semi-persistent and dynamic scheduling may be used to mitigate interference to and from radars. In additional embodiments, dynamic suspension of PDCCH CORSETs may be used to mitigate PDCCH interference to and from radars.

Defining multiple PDCCH search space groups may be used to mitigate interference to and from radars. In these embodiments, to prevent radar interference from impacting WTRU-specific PDCCH transmissions, multiple CORESETs for WTRU-specific PDCCH types may be defined, where the multiple CORESETs are distributed within the DL BWP. In addition, multiple WTRU-Specific Search Space (USS) groups distributed across the CORESETs may be defined. Within each USS group, multiple USSs may be defined with different monitoring periodicities and offsets. One of the USS groups is active and the device may switch between groups either explicitly, e.g., based on MAC signaling (MAC-CE) and/or dynamic group-common signaling, or implicitly, e.g., based on detection of PDCCH in one of the groups. The switching of the search space group may be triggered for a WTRU when the radar interference exceeds a threshold. The threshold may be preconfigured, determined dynamically or provided by an external entity.

The gNB may use information characterizing the operation of the radar to determine the interference level. In one example, radar angle of arrival (AoA) information is used by the gNB to determine the spatial direction of the radar interference in the cell. The gNB may determine a WTRU's location based on the spatial direction of an SSB or CSI-RS that is QCL-ed with the antenna port(s) used for transmission of the PDCCH. Alternatively, the WTRU's location may be determined by the gNB using positioning algorithms, may be (pre)configured in the gNB via an OAM interface, or may be reported to the gNB by the WTRU. The gNB would determine PDCCH search space group for WTRUs located in areas of the cell that would incur radar interference exceeding a threshold.

In certain embodiments, enhanced triggering of PDCCH aggregation level may be used for WTRUs that will incur interference from radars. In these embodiments, the PDCCH aggregation level is nominally determined based on the channel quality indicator (CQI) reported by the WTRU via a channel state information (CSI) report. However, due to the potential sporadic nature of the radar interference, the CSI report may not always reflect the channel quality degradation caused by the radar interference. To coexist with a radar, a gNB may increase the PDCCH aggregation level for WTRUs that will incur interference from the radar to ensure the robustness of PDCCH transmission and reception. This solution can be beneficial even when PDCCH transmission within the radar bandwidth are avoided as discussed in the prior embodiments. This is because radar signal is usually transmitted at a very high power. As a result, even the power "leakage" outside the radar bandwidth may cause significant interference to the WTRUs, especially when the main beam of the radar is pointing toward the 5G system.

To coexist with a radar, the gNB can decrease the SINR threshold of the PDCCH aggregation level triggering to provide additional margin for robustness, where the SINR level may be determined from the reported CQI. The amount of margin may be OAM configurable or be dynamically determined by the radar interference level measured by the gNB or by the external sensors and different margins can be considered for different aggregation levels. In addition, the gNB may configure a minimum PDCCH aggregation level to apply when the radar measured radar interference is strong.

The reduction of the CQI/SINR threshold for PDCCH aggregation and/or applying a minimum PDCCH aggregation level may be triggered for a WTRU when the radar interference exceeds a threshold. The threshold may be preconfigured, determined dynamically or provided by an external entity.

The gNB may use information characterizing the operation of the radar to determine the interference level. In one example, radar AOA information is used by the gNB to determine the spatial direction of the radar interference in the cell. The gNB may determine a WTRU's location based on the spatial direction of an SSB or CSI-RS that is QCL-ed with the antenna port(s) used for transmission of the PDCCH. Alternatively, the WTRU's location may be determined by the gNB using positioning algorithms, may be (pre)configured in the gNB via an OAM interface, or may be reported to the gNB by the WTRU. The gNB would then apply the CQI/SINR threshold reduction to promote the triggering of PDCCH aggregation and/or applying a minimum PDCCH aggregation level for WTRUs located in areas of the cell that would incur radar interference exceeding a threshold.

In other embodiments, dynamic switching between semi-persistent and dynamic scheduling may be used to mitigate interference to and from radars. A radar system oftentimes involves some form of beam scanning, either mechanically or electronically, in order to detect and determine the distance (ranging), angle, and radial velocity of objects in its surrounding. This operational characteristic translates to a time dependent interference from radar to a 5G system and vice versa in the context of coexistence. That is, the interference to/from the radar is strongest when the main beam of the radar is pointing toward at the 5G system. When the main beam of the radar rotates away (either azimuthally or elevation-wise), the interference level is significantly lower.

To mitigate dynamic higher power radar interference, gNB can (re)configure downlink semi-persistent scheduling and/or (Type 2) uplink configured grants with PRB resources not overlapping with the radar bandwidth for any incoming WTRUs and/or existing RRC connected WTRUs. During the period when radar interference is deemed significant, e.g., exceeding a threshold, the gNB can activate the semi-persistent scheduling/configured grants to maintain a minimum quality of service (QoS) while mitigating the impact of radar on PDCCH and reducing the downlink control signaling overhead. During this period, dynamic scheduling may still be used, but only on an as needed basis. When the radar interference falls below the threshold, gNB may deactivate the semi-persistent scheduling and/or (Type 2) uplink configured grants and make use of dynamic scheduling to maximize spectral efficiency.

According to further embodiments, dynamic suspension of PDCCH CORSETs may be used to mitigate interference to and from radars. To prevent radar interference from impacting WTRU-specific PDCCH transmissions, multiple CORESETs for WTRU-specific PDCCH types may be defined, where the multiple CORESETs are distributed within the BWP. In Release 15, the maximum number of CORESETs configurable on a serving cell is twelve, while in Release 16, this number is increased to sixteen. A WTRU may be configured with one or more CORESETs with a maximum of three CORESETs per configured downlink BWP. Upon the detection of radar interference that overlaps with one or more CORESETs, the network can stop transmitting PDCCHs over the impacted CORESETs and use MAC-CE, dedicated DCI or group common signaling to inform the WTRUs that are configured with the impacted CORESETs to skip monitoring the search spaces of suspended CORESETs to mitigate interference to and from the radar. The reduced PDCCH monitoring activities increases WTRU battery efficiency.

An example of an PDCCH CORESET suspension MAC-CE command is described below. The field PDCCH CORSETs suspension bitmap (e.g., in the increasing order of ControlResourceSetId or ControlResourceSetId-r16, whichever is applicable) field can be used to indicate whether each CORESET is suspended (e.g., if the corresponding is set to bit=1) or not (e.g., if the corresponding is set to bit=0). In some embodiments, a PDCCH CORSETs suspension timer field may be used to define a suspension duration, after which the previously received suspension command is considered expired. In one embodiment, a special value (e.g., 255) may also be used to indicate an infinite duration, or until the current command is overwritten by a new PDCCH CORESETs suspension command. Note that the network only needs to send the PDCCH CORESETs suspension command to WTRUs that have at least one configured CORESET that needs to be suspended or restored (unsuspended).

R/F/LCID (1 byte): Reserved bit (R) is set=0, the format field (F) is 1-bit, Logical Channel ID (LCID) is 6-bits;

Extended Logic Channel ID (eLCID) (1 or 2 bytes): 1-byte if LCID=33, 2-bytes if LCID=34, a unique eLCID value (e.g., 256) may be used to identify the WTRU beam nulling activation/deactivation command;

L (1 or 2 bytes): 1-byte if F=0, 2-bytes if F=1, the length field indicating the length of the corresponding MAC SDU or variable sized MAC-CE in bytes;

PDCCH CORSETs suspension bitmap (2-bytes, 0 . . . 15);

PDCCH CORSETs suspension timer (1-byte, 0 . . . 255, unit=radio frames, the value 255 indicates indefinite suspension time).

Upon the reception of PDCCH CORESETs suspension command, a PDCCH CORESETs suspension capable WTRU may start/restart the suspension timer and skip the PDCCH blind search over any search spaces linked to the suspended CORESETs, as indicated by the suspension bitmap, until the suspension timer expires. Upon the reception of an updated PDCCH CORESETs suspension command before the suspension timer expires, WTRU will follow the suspension bitmap in the newly received command to perform blind search over the configured search spaces or activated search space groups located in the CORESET with bitmap value set=1 and restart the suspension timer.

The WTRU should be able inform the network of its capability to support PDCCH CORESETs suspension. A WTRU not supporting PDCCH CORESETs suspension will continue monitoring all configured PDCCH search spaces or activated search space groups. An example of information for a WTRU PDCCH CORSETs suspension capabilities message is shown below in Table 1.

TABLE 1

WTRU PDCCH CORSET Suspension Capabilities Message

| Definitions for parameters | Per | M | FDD – TDD DIFF | FR1 – FR2 DIFF |
|---|---|---|---|---|
| pdcchCoresetsSuspension Indicates whether the WTRU supports PDCCH CORESETs suspension | WTRU | No | No | No |

Referring to FIG. 8, a general method 800 for detecting and mitigating interference with PDCCH of a DL BWP is shown. A node, external or internal, to the network can determine/measure 805 the interferer/radar characteristics such as carrier frequency, bandwidth, periodicity, dwell time, angle of arrival (AoA), and/or power spectral density (PSD). One or all of these measurements can additionally or alternatively be determined within the wireless network by observing the measurements relevant to both WTRUs and the gNBs. If 810 a transmission power of a potential interferer exceeds a predetermined threshold, the network may then determine 815 the set of WTRUs, if any, that may incur significant interference from the interferer on the corresponding PDCCH physical resource blocks (PRBs). When it is determined 815 that an interferer may impact PDCCH PRBs for a given WTRU, one or more of the embodiments for mitigating interference described herein may be implemented or activated 820. The detection of interference impacting PDCCH PRBs may be referred to as an "interference event," and may be used to trigger one or more of the mitigation techniques of the described embodiments.

In embodiments defining multiple PDCCH search space groups to mitigate interference to and from radars, multiple CORESETs are defined which are distributed in frequency locations within the DL BWP. Further multiple WTRU-Specific Search Space (USS) groups may be defined that are distributed across the CORESETs. Within each USS group, multiple USSs may be defined with different monitoring periodicities and offsets. Therefore, if one or more USS group(s) is (are) corrupted by the high-power narrowband interferer, i.e., an interference event is detected, the WTRU may be triggered to utilize one of the remaining USS group(s) that are not impacted by the interferer.

As mentioned in reference to FIG. 8, a node, internal or external, to the network can determine the interferer characteristics such as carrier frequency, bandwidth, periodicity, dwell time, AoA, and PSD. These measurements can also be determined within the wireless network by observing the measurements relevant to both WTRUs and the gNBs. The network determines the set of WTRUs that incur significant interference from radar on their configured PDCCH PRBs. Upon occurrence of the interference event, the network switches the WTRU to a USS group that will not incur interference from the radar for the selected WTRUs to mitigate the interference from radars. In one embodiment, DCI may be used to implicitly switch to the desired USS group based on detection of PDCCH in one of the groups. In another embodiment, WTRU-group common signaling may be used to explicitly switch to the desired USS group. In yet another embodiment, MAC signaling (e.g., MAC-CE) could be used to explicitly switch to the desired USS group.

For embodiments using enhanced triggering of PDCCH aggregation level for WTRUs to mitigate interference from radars, the network determines the set of WTRUs that incur significant interference from radar on their configured PDCCH PRBs. The network determines the amount of channel quality indicator (CQI)/signal interference to noise ratio (SINR) threshold reduction to promote the triggering PDCCH aggregation and/or invoke a minimum PDCCH aggregation level for the selected WTRUs to mitigate the interference from radars.

In embodiments using dynamic switching between semi-persistent and dynamic scheduling to mitigate interference to and from radars, the network configures WTRUs with downlink semi-persistent scheduling and uplink Type-2 configured grants on PRBs outside the radar bandwidth, without necessarily activating semi-persistent transmissions. UL data transmission are primarily based on dynamic scheduling to maximize spectral efficiency. The network determines the set of WTRUs that incur significant interference from radar on their configured PDCCH PRBs and activates the semi-persistent downlink and uplink transmissions via DCI for the selected WTRUs to mitigate radar interference on the PDCCH while maintaining a minimum quality of service (QoS).

Figure 9:
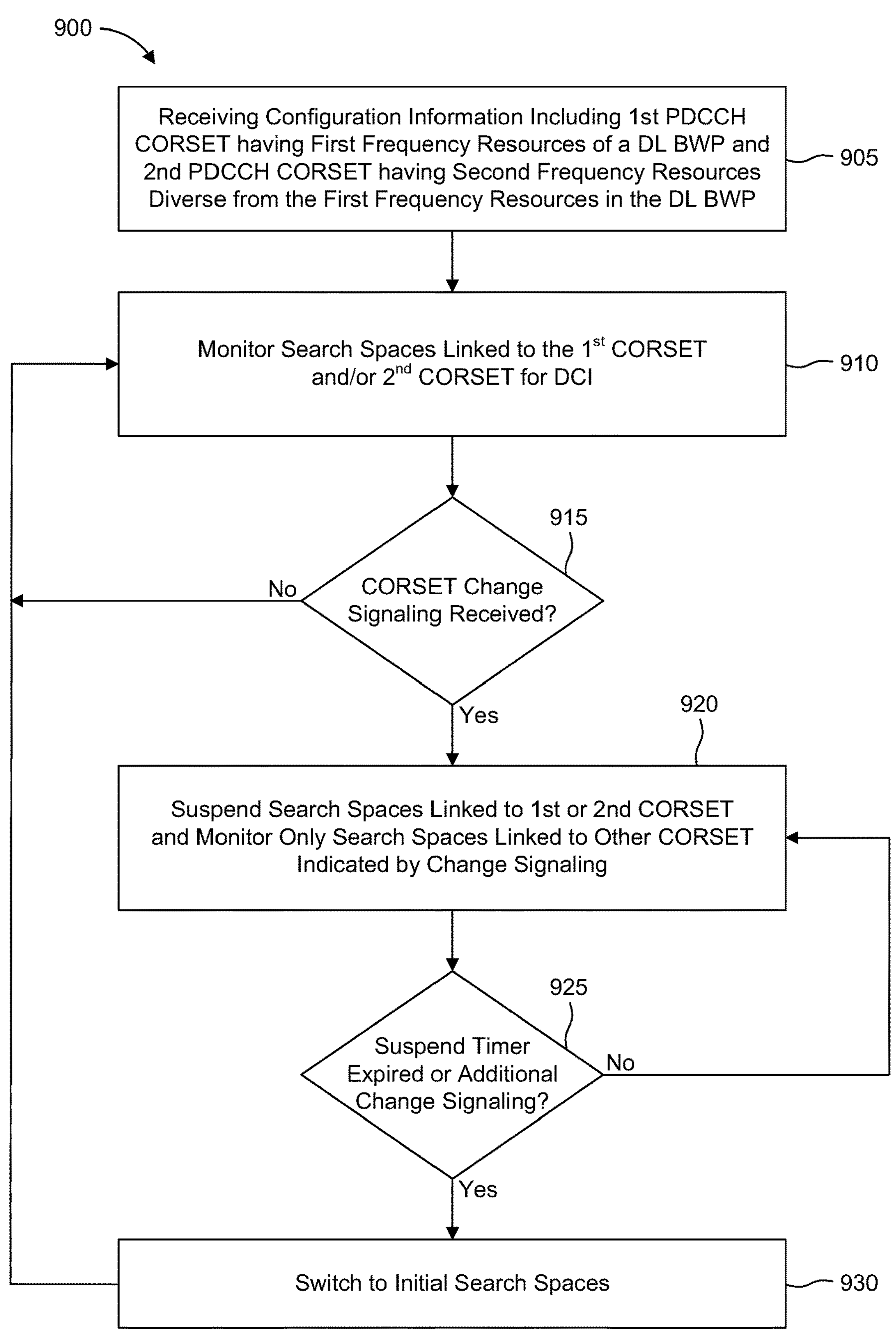
FIG. 9 is a flow diagram showing an example method of mitigating interference of downlink control information (DCI) using CORSET-based suspend and timing control according to an embodiment.

Referring to FIG. 9, an example method 900 for dynamic suspension of PDCCH CORSETs to mitigate interference to and from radars is shown. Initially, multiple PDCCH CORESETs are defined with resources that are distributed in frequency locations within the DL BWP. The network may provide, and the WTRU may receive 905, first and second PDCCH CORSETs as configuration information. The WTRU may potentially be over-provisioned with at least one additional PDCCH CORSET having frequency resources in the DL BWP that are diverse from frequency resources of the other configured PDCCH CORSET, and that are not used unless otherwise activated. In other embodiments, a WTRU may monitor search spaces linked to both first and second CORSETs provided in the configuration information.

The WTRU monitors search spaces linked to the active first and/or second PDCCH CORESETs for downlink control information (DCI). When the network determines the WTRU may incur interference, e.g., an interference level that exceeds a threshold, from radar on the corresponding PDCCH CORESETs, the network may signal the WTRU to suspend the monitoring of search spaces linked to an active CORSET (e.g., first or second PDCCH CORSET). In some embodiments, change signaling 915 is received by the WTRU with a CORSET suspend command. By way of the change signaling, the network suspends PDCCH transmissions from CORESETs that will incur interference from the radar for a configurable duration for the selected WTRUs to mitigate the interference from radars. In response to receiving change signaling 915, the WTRU suspends 920 monitoring search spaces linked to the suspended CORSET(s) and only monitors search spaces linked to an active CORSET, e.g., the 2nd PDCCH CORSET, for DCI.

The WTRU may continue monitoring 920 only search spaces of the active CORSET, and not those linked to the suspended CORSET for a certain time period. In some embodiments, a timer is associated with the change signaling 915, and upon expiration of the time period associated with the timer 925, the WTRU may resume monitoring 930 the search spaces of the CORSET that was temporarily suspended, e.g., the initially active CORSET. Thereafter, the WTRU monitors 910 the search spaces linked to the active CORSET(s). Alternatively, or in addition, the WTRU may continue monitoring 920 only search spaces of the active CORSET, i.e., not a suspended CORSET, until additional change signaling is received 925 from the network. In one embodiment, a timer may be set to a special value, e.g., =255, which suspends WTRU monitoring of search spaces linked to the initial PDCCH CORSET indefinitely. In this case, the WTRU will only resume monitoring the original search spaces linked to initially active PDCCH CORSETs, when additional change signaling is received 925 by the WTRU from the network. In certain example embodiments, there may be no need or desire to switch back to the search spaces of the original active PDCCH CORSET frequency resources until, for example, another interference event is detected or the currently unsuspended CORESET frequency resources of the DL BWP are needed for another purpose or use. Various alternatives or combinations may be used which are implementation specific or discretionary to the network designer.

In one embodiment, MAC signaling (e.g., a MAC-CE) may be used as change signaling 915 to suspend/activate the CORESET(s) for the selected WTRUs. In another embodiment, dedicated DCI signaling may be used to suspend and/or activate the CORESETs for the selected WTRUs. In yet another embodiment, WTRU-group common signaling may be used to suspend and/or activate the CORESETs for the selected WTRUs.

In certain embodiments, a method may include a WTRU receiving configuration information of multiple physical downlink control channel (PDCCH) control resource sets (CORESETs). The CORESETs include at least a first PDCCH CORESET identifying first frequency resources of a downlink (DL) bandwidth part (BWP) for detection of downlink control information (DCI) and a second PDCCH CORESET identifying second frequency resources of the DL BWP for detection of DCI. In one example, the first frequency resources and second frequency resources are different.

The method includes monitoring one or more search spaces linked to active PDCCH CORSETs for transmissions of DCI and receiving signaling from a network to suspend monitoring of search spaces linked to one of the first PDCCH CORSET or the second PDCCH CORESET. In certain embodiments, the received signaling including a suspend time period. The WTRU may resume monitoring search spaces linked to a suspended PDCCH CORESET upon occurrence of the suspend time period or receiving unsuspend CORSET signaling. The received signaling may indicate to the WTRU to bypass a PDCCH blind search over any search spaces linked to a suspended PDCCH CORSET.

In some embodiments, different PDCCH CORESETs can be associated with the same or different CORESET pools; different PDCCH CORESETs can be associated with the same or different TCI states; different search spaces may or may not be linked to each other. When two search spaces are linked to each other (e.g., to facilitate PDCCH repetition), and if the CORESET a first search space linked to is suspended and the CORESET a second search space linked to is not, the WTRU may suspend monitoring the first search space and only monitor the second search space. The suspend time period may include one or more values representing a time for suspension or a special value indicating indefinite suspension. In certain embodiments, an update signal may be sent by the network including a new bitmap designating which CORSET(s) to suspend and unsuspend and/or a new suspend time period, and when received, the WTRU may suspend monitoring of search spaces for a duration of the new suspend time period. As mentioned, the signaling may be performed using one of a medium access control (MAC) control element (CE), dedicated DCI signaling or WTRU group common signaling.

As described in the example embodiments above, interference between local non-network devices and PDCCH resources between a gNB and WTRU may be detected and minimized. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for a wireless transmit receive unit (WTRU), the method comprising:

receiving configuration information of multiple physical downlink control channel (PDCCH) control resource sets (CORESETs) including at least a first PDCCH CORESET identifying first frequency resources of a downlink (DL) bandwidth part (BWP) for detection of downlink control information (DCI) and a second PDCCH CORESET identifying second frequency resources of the DL BWP for detection of DCI;

monitoring one or more search spaces linked to active PDCCH CORESETs for transmissions of DCI;

receiving signaling from a network to suspend monitoring of all search spaces linked to one of the first PDCCH CORESET or the second PDCCH CORESET to mitigate an interference event in the corresponding first frequency resources or the second frequency resources, irrespective of whether search spaces are linked to each other; the received signaling including a suspend time period;

continuing monitoring for DCI transmissions in the one or more search spaces linked to the active PDCCH CORESETS other than the search spaces linked to a corresponding suspended first PDCCH CORESET or suspended second PDCCH CORESET; and resuming monitoring search spaces linked to the corresponding suspended PDCCH CORESET upon occurrence of the suspend time period or receiving unsuspend CORESET signaling.

2. The method of claim 1, wherein the first frequency resources and second frequency resources are different.

3. The method of claim 1, wherein different PDCCH CORESETs are associated with a same or different CORESET pool and wherein different PDCCH CORESETs are associated with a same or different TCI states.

4. The method of claim 1, wherein the suspend time period may include one or more values representing a time for suspension or a special value indicating indefinite suspension.

5. The method of claim 1, further comprising:

receiving update signaling including a new bitmap designating which CORESET(s) to suspend and unsuspend and/or a new suspend time period, and wherein suspended monitoring of search spaces occurs for a duration of the new suspend time period.

6. The method of claim 1, wherein the received signaling indicates bypassing a PDCCH blind search over any search spaces linked to a suspended PDCCH CORESET.

7. The method of claim 1, wherein the received signaling is in response to network detection of an interferer of PDCCH resources.

8. The method of claim 1, wherein the received signaling comprises one of a medium access control (MAC) control element (CE), dedicated DCI signaling or WTRU group common signaling.

9. The method of claim 1, wherein the received signaling comprises a bitmap designating which CORESET to suspend and unsuspend.

10. A wireless transmit receive unit (WTRU) comprising:

a receiver and a processor in communication with the receiver, the receiver and processor configured to:

receive configuration information of multiple physical downlink control channel (PDCCH) control resource sets (CORESETs) including at least a first PDCCH CORESET identifying first frequency resources of a downlink (DL) bandwidth part (BWP) for detection of downlink control information (DCI) and a second PDCCH CORESET identifying second frequency resources of the DL BWP for detection of DCI;

monitor one or more search spaces linked to active PDCCH CORESETs for transmissions of DCI;

receive signaling from a network to suspend monitoring of all search spaces linked to one of the first PDCCH CORESET or the second PDCCH CORESET to mitigate an interference event in the corresponding first frequency resources or the second frequency resources, irrespective of whether search spaces are linked to each other; the received signaling including a suspend time period;

continue monitoring for DCI transmissions in the one or more search spaces linked to the active PDCCH CORESETS other than search spaces linked to a corresponding suspended first PDCCH CORESET or suspended second PDCCH CORESET; and resume monitoring search spaces linked to the corresponding suspended PDCCH CORESET upon occurrence of the suspend time period or receiving unsuspend CORESET signaling.

11. The WTRU of claim 10, wherein different PDCCH CORESETs are associated with a same or different CORESET pool or wherein different PDCCH CORESETs are associated with the same or different TCI states.

12. The WTRU of claim 10, wherein the suspend time period may include one or more values representing a time for suspension or a special value indicating indefinite suspension.

13. The WTRU of claim 10, wherein the receiver and processor are further configured to:

receive update signaling including a bitmap designating which CORESET(s) to suspend and unsuspend and/or a new suspend time period, and wherein suspended monitoring of search spaces occurs for a duration of the new suspend time period.

14. The WTRU of claim 10, wherein the received signaling causes bypassing a PDCCH blind search over any search spaces linked to a suspended PDCCH CORESET.

15. The WTRU of claim 10, wherein the received signaling is in response to network detection of an interferer of PDCCH resources.

16. The WTRU of claim 10, wherein the received signaling comprises one of a medium access control (MAC) control element (CE), dedicated DCI signaling or WTRU group common signaling.

17. The WTRU of claim 10, wherein the received signaling comprises a bitmap designating which CORESET to suspend and unsuspend.

* * * * *